US012810543B2

(12) United States Patent
Akiyama et al.

(10) Patent No.: US 12,810,543 B2
(45) Date of Patent: Nov. 24, 2026

(54) HEAD MOUNTED DISPLAY, HEAD MOUNTED DISPLAY SYSTEM, AND METHOD OF DISPLAYING HEAD MOUNTED DISPLAY

(71) Applicant: MAXELL, LTD., Kyoto (JP)

(72) Inventors: Hitoshi Akiyama, Otokuni-gun (JP); Shigeyuki Itou, Otokuni-gun (JP)

(73) Assignee: Maxell, Ltd., Kyoto (JP)

( * ) Notice: Subject to any disclaimer, the term of this patent is extended or adjusted under 35 U.S.C. 154(b) by 14 days.

(21) Appl. No.: 18/715,958

(22) PCT Filed: Dec. 7, 2021

(86) PCT No.: PCT/JP2021/045020
§ 371 (c)(1),
(2) Date: Jun. 3, 2024

(87) PCT Pub. No.: WO2023/105653
PCT Pub. Date: Jun. 15, 2023

(65) Prior Publication Data
US 2025/0029327 A1 Jan. 23, 2025

(51) Int. Cl.
*G06T 17/00* (2006.01)
*G02B 27/01* (2006.01)
(Continued)

(52) U.S. Cl.
CPC ............ *G06T 17/00* (2013.01); *G02B 27/017* (2013.01); *G06T 5/50* (2013.01); *G06T 7/13* (2017.01); *G06T 2207/20221* (2013.01)

(58) Field of Classification Search
CPC .. G06T 7/13; G06T 5/50; G06T 17/00; G06T 2207/20221; G06T 19/006; G06T 19/20;
(Continued)

(56) References Cited

U.S. PATENT DOCUMENTS 11,526,721 B1 * 12/2022 O'Malley .............. G06F 30/15
2013/0176337 A1 * 7/2013 Lu .......................... G06F 3/011
345/633
(Continued)

FOREIGN PATENT DOCUMENTS

JP 2013-257716 A 12/2013
JP 2015-143976 A 8/2015
(Continued)

OTHER PUBLICATIONS

Office Action dated Jun. 10, 2025, issued in corresponding Japan patent application No. 2023-565753, 13 pages.
(Continued)

*Primary Examiner* — Xilin Guo
(74) *Attorney, Agent, or Firm* — Rimon P.C.

(57) ABSTRACT

The purpose of this invention is to provide a VRHMD and a system equipped with a VRHMD that can appropriately grasp the surrounding situation even while experiencing a VR space, by determining whether the surrounding situation is that the wearer wants to grasp, even if it is outside the safe activity area of the wearer of the VRHMD (head mounted display for virtual space), and displaying it on the display of the VRHMD according to the result even if it is outside the safe activity area. Also, the purpose is to provide a display method regarding this display.

16 Claims, 20 Drawing Sheets

(51) Int. Cl.
*G06T 5/50* (2006.01)
*G06T 7/13* (2017.01)

(58) Field of Classification Search
CPC .... G06T 7/70; G06T 7/60; G06T 7/10; G02B 27/017; G02B 2027/0138; G02B 2027/014; G06F 3/011; G06F 3/04815; G06F 3/0346; G06V 10/44
See application file for complete search history.

(56) References Cited

U.S. PATENT DOCUMENTS

| | | | |
|---|---|---|---|
| 2013/0328928 A1 | 12/2013 | Yamagishi et al. | |
| 2016/0054565 A1 | 2/2016 | Izumihara et al. | |
| 2018/0004286 A1 | 1/2018 | Chen | |
| 2018/0139565 A1 | 5/2018 | Norris et al. | |
| 2018/0373349 A1 | 12/2018 | Okumura et al. | |
| 2019/0139307 A1* | 5/2019 | Min | A63F 13/212 |
| 2020/0225495 A1 | 7/2020 | Kiemele et al. | |
| 2020/0258278 A1 | 8/2020 | Mirhosseini et al. | |
| 2021/0405959 A1* | 12/2021 | Lovitt | G06F 3/165 |

FOREIGN PATENT DOCUMENTS

| | | |
|---|---|---|
| JP | 2019-527881 A | 10/2019 |
| JP | 2020-536305 A | 12/2020 |
| WO | 2014/156389 A1 | 10/2014 |
| WO | 2017/094608 A1 | 6/2017 |

OTHER PUBLICATIONS

International Search Report received in the PCT Application No. PCT/JP2021/045020, dated Feb. 1, 2022, w/ English Translation.

Office Action issued in the corresponding Japanese Patent Application No. 2025-272614 on Oct. 20, 2026, w/ English Translation.

* cited by examiner

HEAD MOUNTED DISPLAY, HEAD MOUNTED DISPLAY SYSTEM, AND METHOD OF DISPLAYING HEAD MOUNTED DISPLAY

CROSS-REFERENCE TO RELATED APPLICATIONS

This application is the U.S. National Phase under 35 U.S.C. § 371 of International Application No. PCT/JP2021/045020, filed on Dec. 7, 2021.

TECHNICAL FIELD

This invention relates to a head mounted display (Head Mounted Display) for virtual space (Virtual Reality), a system using the head mounted display, and a display method in the head mounted display. Note that, the head mounted display for virtual space may hereinafter be referred to as a VRHMD.

BACKGROUND ART

Virtual space (hereinafter referred to as VR space) is used in various fields such as gaming, education, and tourism. A VRHMD is used to experience this VR space. VRHMD, for example, is a device that is worn on the head and displays virtual space images on a goggle-like display. This device is equipped with, as an example, a camera, a sensor to measure the distance to an object, multiple sensors such as a position measurement sensor, a CPU that performs image processing, and a battery. When wearing this VRHMD and experiencing a VR space, the wearer may move freely within the VR space, depending on the content of the experience, is considered. However, the actual space where the wearer is located has walls, desks, and various other objects (obstacles, etc.) that limit where the wearer can move around. Therefore, for safety reasons, when a VRHMD wearer approaches a limit on the area of activity to avoid these obstacles, that is a boundary within which they can move around safely, it is performed that recognizing of the limits of his/her actions, such as superimposed displaying the boundary on the VRHMD's display, etc.

Here, when the obstacle is fixed, it is useful to indicate on the display that the wearer of the VRHMD is approaching the boundary of the safe activity area described above, but it is also considered that, for example, a person, an animal such as a dog, or an object such as a ball may intrude into this safe activity area. Regarding such this perspective, there are known technologies that superimpose or otherwise display the intruding person, animal, etc. on the VRHMD display when such a person, animal, etc. intrudes into the safe activity area.

CITATION LIST

Patent Literature

PTL 1: JP 2013-257716 A
PTL 2: JP 2015-143976 A

SUMMARY OF INVENTION

Technical Problem

When wearing a VRHMD and experiencing a VR space, the immersive feeling may cause the experiencer to want to grasp what the surrounding situation is like, especially outside the safe activity area. Some of the reasons for this include.

- Don't want to be seen situation immersed in VR space by someone.
- Someone appeared in the actual space where the VRHMD wearer is.
- The wearer is immersed and unable to speak to the wearer, although for some reason he/she wants to inform the wearer.
- The phone call is coming in.
- The chime of a visitor's arrival is sounding. various things can be mentioned.

Here, in the conventional example, if a person or other intrudes within the safe activity area of the VRHMD wearer, the person or other can be superimposed etc. on the VRHMD display, but if a person appears outside the safe activity area, the situation cannot be grasped.

Therefore, the purpose of this invention is to provide a VRHMD and a system equipped with a VRHMD that can appropriately grasp the surrounding situation even while experiencing a VR space, by determining whether the surrounding situation is that the wearer wants to grasp, even if it is outside the safe activity area of the wearer of the VRHMD, and displaying it on the display of the VRHMD according to the result even if it is outside the safe activity area. Also, the purpose is to provide a display method regarding this display.

Solution to Problem

According to a first aspect of the present invention, the following head mounted display is provided. That is, the head mounted display is head mounted display for virtual space. The head mounted display includes a display, a camera, a distance detector, an image generator, a memory, and a controller. The display that displays image. The camera that captures real space. The distance detector that detects distance to object in real space. The image generator that generates image to be displayed on the display. The memory that stores the type condition and distance condition of the object to be displayed. And, the controller recognizes the type of object from the captured image of the camera, extracts object that matches the type condition and distance condition, superimposes image of showing extracted object on the image of the virtual space, and displays on the display.

According to a second aspect of the present invention, the following head mounted display system is provided. That is, head mounted display system including a camera that captures real space, and a head mounted display for virtual space. The head mounted display includes a display that displays image, a distance detector that detects distance to object in real space, an image generator that generates image to be displayed on the display, a memory that stores the type condition and distance condition of the object to be displayed, and a controller. And, the controller recognizes the type of object from the captured image of the camera, extracts object that matches the type condition and distance condition, superimposes image 41 showing extracted object on the image of the virtual space and displays on the display.

According to a third aspect of the present invention, the following method of displaying head mounted display is provided. This display method is method performed using a head mounted display for virtual space. This method includes a memory step that stores the type condition and distance condition of the object to be displayed, an image generation step that generates an image drawing the virtual space, a shooting step that captures the real space around the head mounted display, a distance detection step that detects the distance to object in the real space, a recognition step that recognizes the type of object from the captured image, an extraction step that extracts object that matches the type condition and distance condition, from the recognized object, and a superimposed display step that superimposes image of showing extracted object on the image of the virtual space and displays.

Advantageous Effects of Invention

According to the present invention, it is provided a VRHMD and a system equipped with a VRHMD that can appropriately grasp the surrounding situation even while experiencing a VR space, by determining whether the surrounding situation is that the wearer wants to grasp, even if it is outside the safe activity area of the wearer of the VRHMD (head mounted display for virtual space), and displaying it on the display of the VRHMD according to the result even if it is outside the safe activity area. Also, it is provided a display method regarding this display.

DESCRIPTION OF EMBODIMENTS

Hereinafter, examples of embodiments of the invention will be described using the drawings. The same symbols are applied to similar configurations throughout the drawings, and duplicate explanations may be omitted. According to an embodiment, an HMD (Head Mounted Display) is provided that can appropriately grasp the surrounding situation even outside the safe activity area. By this, as an example, it can contribute to 9. Let's create a foundation for industry and technological innovation of the Sustainable Development Goals (SDGs) proposed by the United Nations.

First Embodiment

Figure 1:
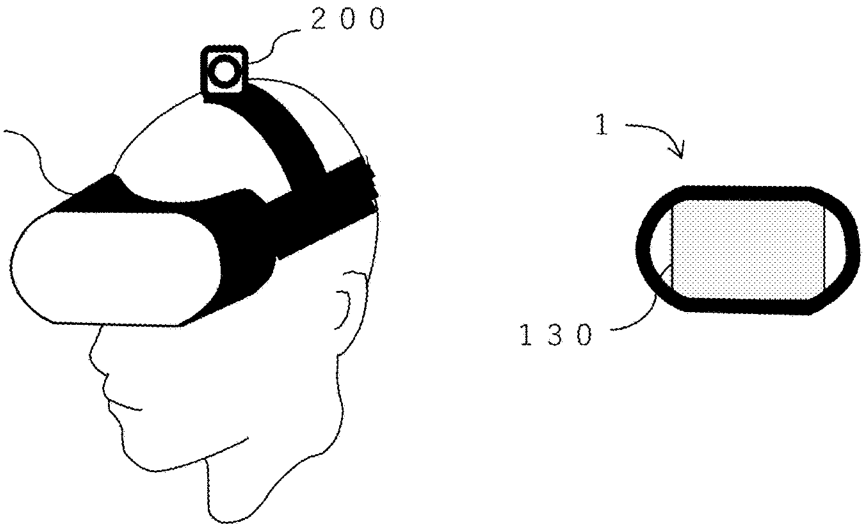
FIG. 1 is a diagram of showing an example of a VRHMD.
Figure 2:
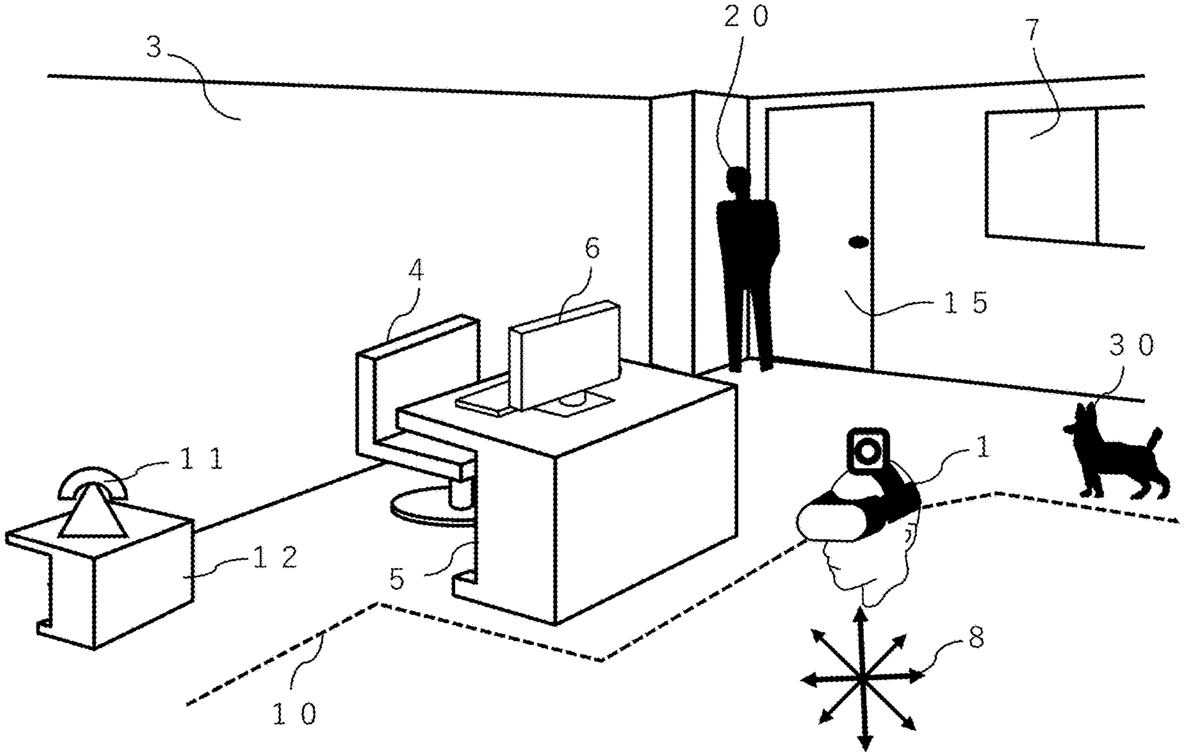
FIG. 2 is a diagram used to illustrate the actual real space where the wearer of the VRHMD is located.

The first embodiment will be described with reference to FIG. 1-11. First, an overview of the VRHMD will be described with reference to FIG. 1-3. FIG. 1 relates to an embodiment of the invention, is an example of a VRHMD, and is a diagram of indicating the VRHMD in a worn state and a display on the inside of the VRHMD. FIG. 2 is a diagram used to illustrate the actual real space where the wearer of the VRHMD is located.

As shown in FIG. 1, VRHMD 1 is equipped with a camera 200 and other, and VRHMD 1 is worn on the head of the user. Here, the camera 200 captures images of the real space around the wearer. The inside of the VRHMD 1 is equipped with a display 130, on which such as the created VR space image and the real space image captured by the camera 200 are displayed.

The wearer of VRHMD 1 experiences VR space in the real space as shown in FIG. 2. And, while experiencing the VR space, the wearer may move in various directions such as forward/backward, left/right, and diagonally as shown in arrow 8, depending on the content of the VR.

However, in the real space where the wearer is, as shown in FIG. 2, there may be various objects, e.g., chair 4, desk (5, 12), personal computer 6, telephone 11, person 20, animal 30, door 15, window 7, and wall 3. Therefore, it is necessary for the wearer during the VR experience to avoid these objects when performing activities such as moving or moving his/her hands. An example of a safe activity area in which the wearer can safely move and perform activities without contacting with these objects is shown by the dotted line 10 in FIG. 2. Note that, during the VR experience, the display 130 shows VR space images and these objects cannot be recognized.

Figure 3:
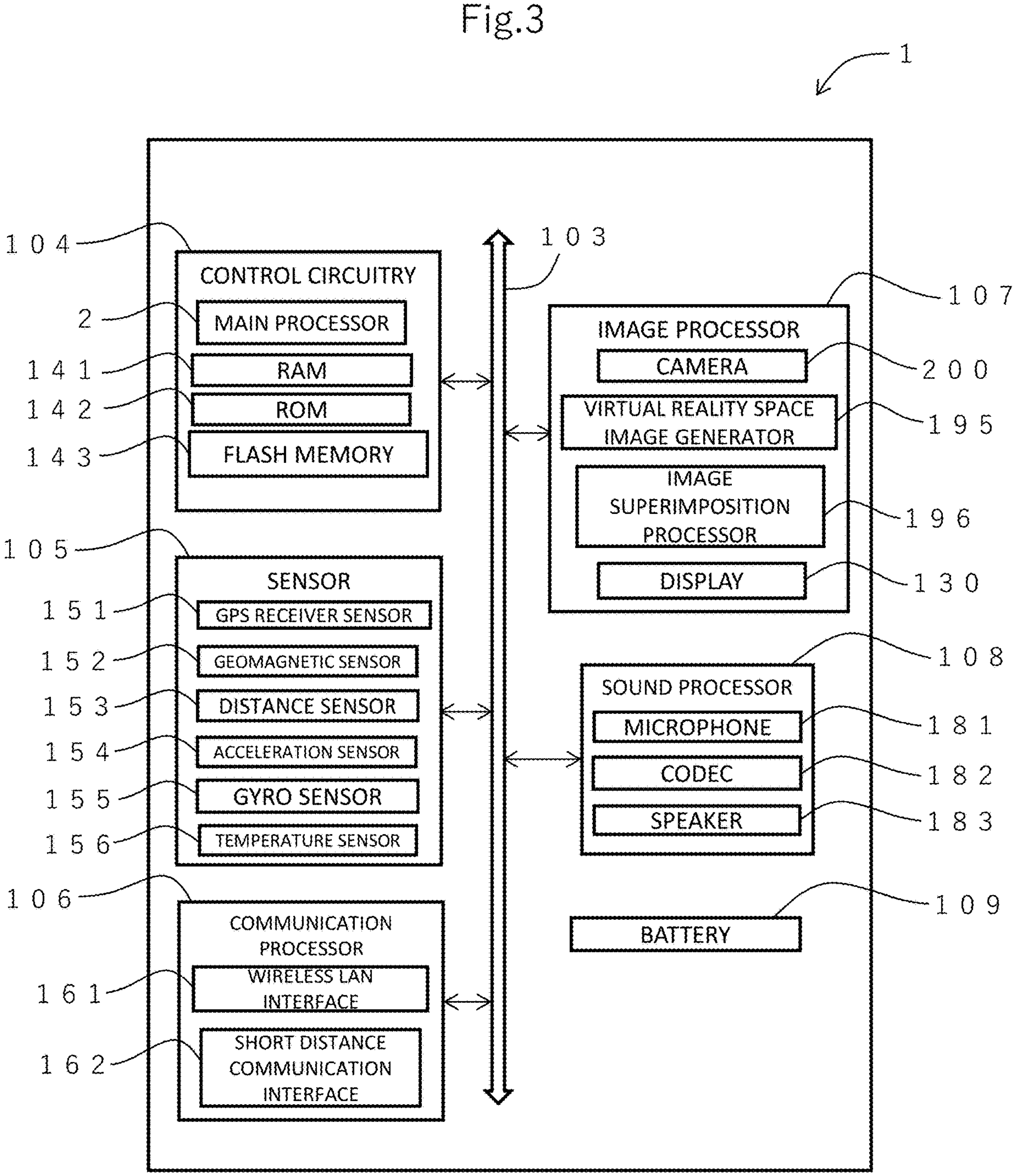
FIG. 3 is a diagram of showing an example of a VRHMD hardware configuration.

Next, with reference to FIG. 3, an example of the hardware configuration of the VRHMD will be described. As shown in FIG. 3, VRHMD 1 is equipped with control circuitry 104, sensor 105, communication processor 106, image processor 107, and sound processor 108, and these (104 to 108) are connected via a data bus 103 for exchanging respective data, etc. VRHMD1 is also equipped with a battery 109 that serves as the power source.

The control circuitry 104 can be configured using, as an example, the main processor 2, RAM (random access memory) 141, ROM (read only memory) 142, and flash memory 143 that stores initial setup information and other, and can be configured to include a controller and a memory. The main processor 2 uses the programs and data stored in the ROM 142 and flash memory 143 and the output data of each (105 to 108) to control the operation of VRHMD1 and various prescribed processes related to the invention.

Sensor 105, as an example, can be configured with a GPS receiver sensor 151 that can be used to acquire location information, a geomagnetic sensor 152, a distance sensor 153 that can detect the distance to an object, an acceleration sensor 154, a gyro sensor 155, and a temperature sensor 156, and can be used for grasping data such as the wearer's condition and the position, size, and temperature of surrounding objects. However, the sensors enumerated here are examples, and it is sufficient to be able to perform the prescribed process, and the enumerated sensors may be omitted as appropriate or other types of sensors may be included.

The image processor 107 is used to generate and display images and can be configured using, as an example, camera 200, VR space image generator 195 (in FIG. 3, virtual reality space image generator), image superimposition processor 196, and display 130. VR space image generator 195 is a configuration used to generate images in VR space. Image superimposition processor 196 is a configuration used to superimpose images in the VR space.

The sound processor 108 can be configured using, as an example, a microphone 181, a codec 182 for processing sound signals, and a speaker 183. The microphone 181 may be provided as appropriate and, as an example, may be provided so that the wearer's voice is input. The microphone 181 may be provided so that external sound may be input when worn. The speaker 183 may be provided, as an example, so as to be adjacent to the wearer's ear when worn.

The communication processor 106 can be configured using, as an example, a wireless LAN interface 161 and a short distance communication interface 162. The wireless LAN interface 161 is used as a communication interface for wireless LAN communication, and the short distance communication interface 162 is used as a communication interface for short distance communication. Note that, as the short distance communication interface, for example, Bluetooth (registered trademark) can be used.

Camera 200 captures images of 360° around the wearer. Here, an example of the configuration of the camera 200 and an example of its operation will be explained using FIGS. 4-5, 6*a* and 6*b*.

Figure 4:
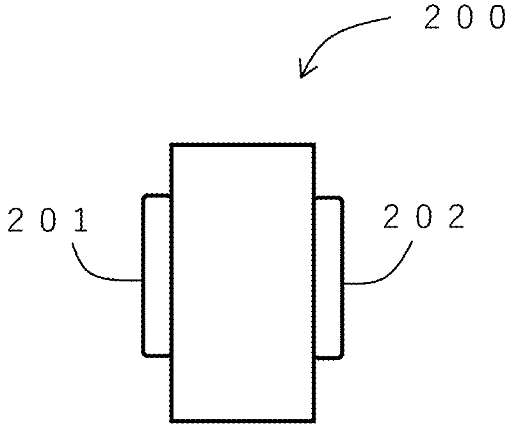
FIG. 4 is a diagram used to illustrate an example of a camera configuration.
Figure 5:
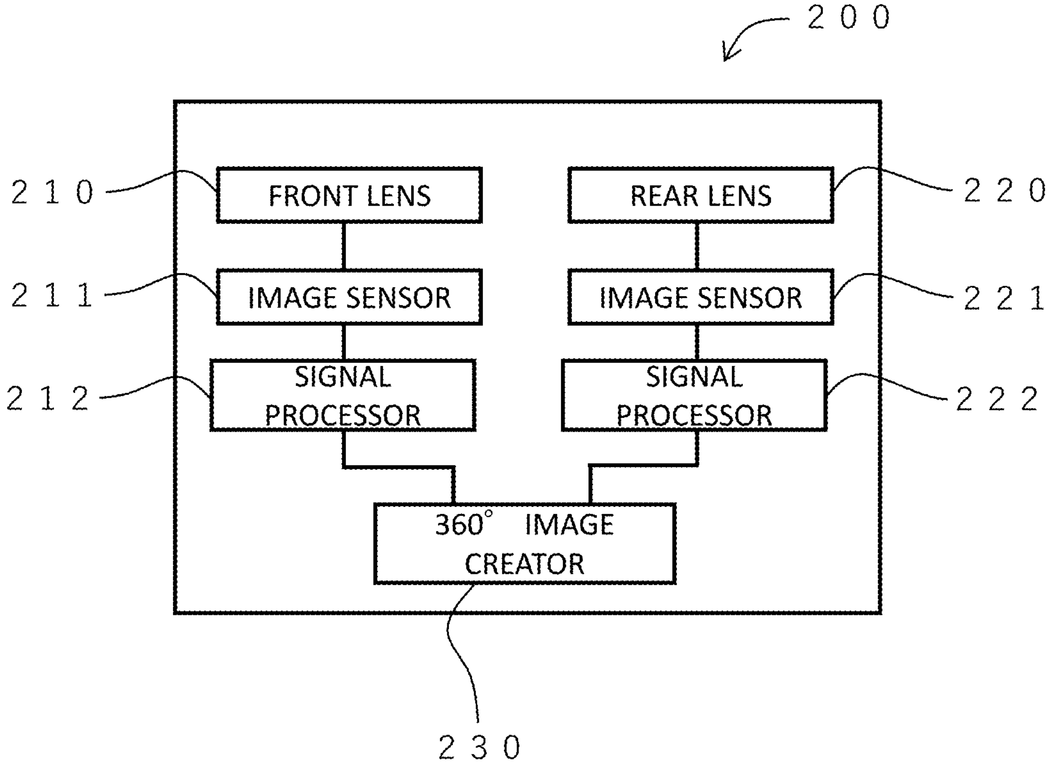
FIG. 5 is a diagram used to illustrate an example of a camera configuration.

As shown in FIG. 4, the camera 200 is provided with two image capturing parts (201, 202) that enable images to be captured from two locations, in front and behind, of the wearer. Here, the image capturing parts (201, 202) are configured to allow light from the outside to enter, and as an example, they can be configured with apertures formed to allow light to enter. And, as shown in FIG. 5, the camera 200 consists of a front lens 210 with a wide viewing angle for capturing the front, a rear lens 220 with a wide viewing angle for capturing the rear, an image sensor (211, 221) corresponding to each lens (210, 220), a signal processor (212, 222) performing signal processing, and a 360° image creator 230 that generates a 360° image of the surroundings from the front and rear capturing images. Here, when a 360° image of the surroundings cannot be obtained due to the narrow viewing angles of the front and rear lenses and the existence of blind spots in the shooting, the image is obtained by the method described next.

In other words, as indicated by arrow 8 in FIG. 2 above, it is assumed that the wearer of VRHMD 1 moves in various directions and turns his/her head to look around. Here, for example, if the viewing angles that can be captured by the front lens 210 and the rear lens 220 of the camera 200 are between the dotted lines 607 and 608 and between the dotted lines 606 and 609 in FIG. 6A, the objects that can be captured are person (700, 704) and animal (702, 703), and the desk 701 will not be captured. If the wearer moves his/her head in this state, as shown in FIG. 6*b*, the objects that can be captured are the person (700, 704) and desk 701, and animal (702, 703) will not be captured. Here, by combining these captured images, a 360° image is obtained.

Next, the setting of the safe activity area is explained. As described above using FIG. 2, it is considered that there may be a chair 4, a desk (5, 12), a personal computer 6, a telephone 11, a person 20, an animal 30, a door 15, a window 7, a wall 3, etc. in the real space where the wearer is. Here, in order for the wearer to safely move or move his/her hands or perform other actions during the VR experience, it is necessary to avoid these objects. In the example in FIG. 2, the safe activity area where it can move or perform actions such as moving his/her hands without contacting with these objects is, as an example, indicated by the dotted line 10 (i.e., the space on the wearer's side with the dotted line 10 as the boundary). Therefore, the area corresponding to this dotted line 10 is set before starting the VR space experience.

Figure 7:
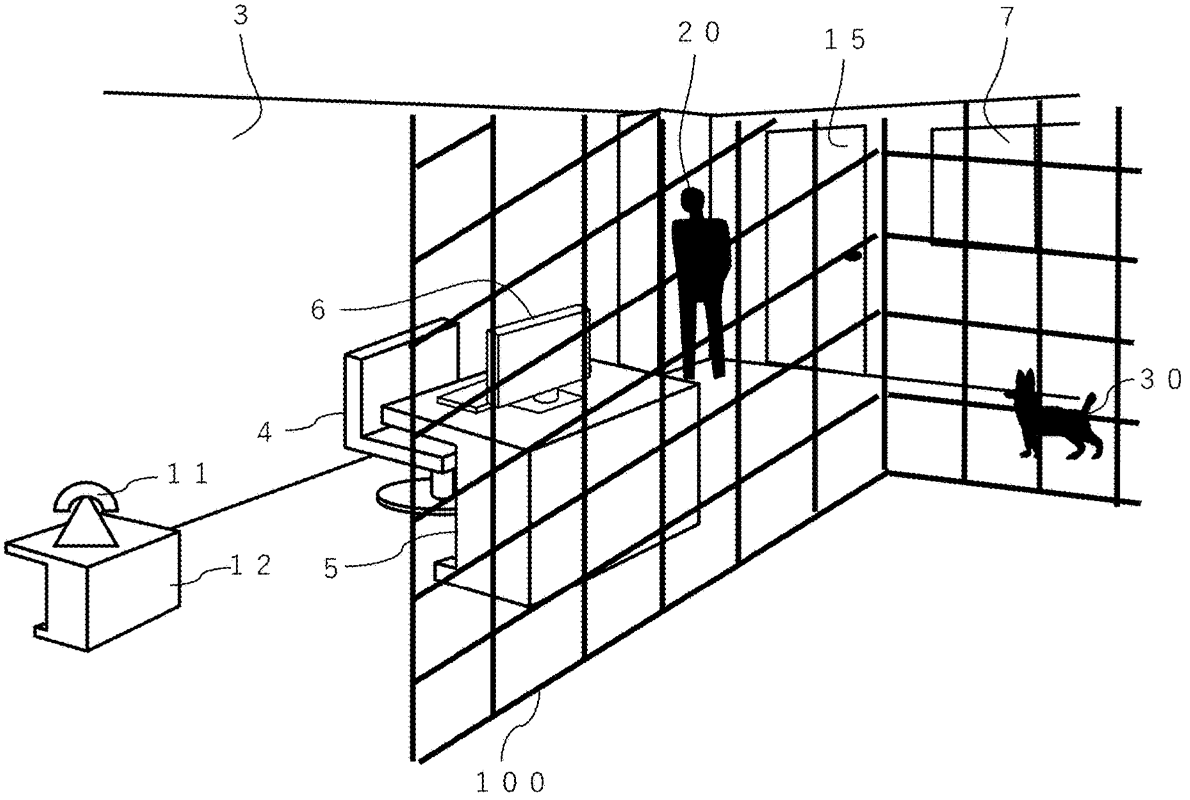
FIG. 7 is a diagram for illustrating an example of the display of the boundaries of the safety activity area.

In this embodiment, as shown in FIG. 7, VRHMD 1 superimposes the boundary of the safe activity area which has the same role as the dotted line 10 in FIG. 2, and objects can be avoided, on the real space image captured by the camera 200, and displays. Specifically, (1) VRHMD 1 uses such as the control circuitry 104, sensor 105, and image processor 107 shown in FIG. 3 to detect the position, size, and distance from the wearer of objects such as chair 4, desk 5, and person 20 that exist in real space. In other words, the position, size, and distance of an object to the wearer are detected in a 360° real space image captured by the camera 200 and created. Then, (2) VRHMD 1 automatically, based on the detected results, sets the boundary 100 where the wearer can avoid the object. Finally, (3) VRHMD 1 superimposes the boundary 100 on the image of the real space captured by the camera 200 and displays it on the display 130. By this display, it allows to confirm the boundary 100 of the safe activity area, before the start of the VR space experience, allowing the wearer to immerse himself/herself in the VR space with peace of mind.

In the above description, a 360° ambient image is captured by camera 200 and that image is used, but the boundary 100 may be set on an image that is not a 360° ambient image, such as a camera that captures only the front of the wearer. In this case, objects around the wearer may be detected each time during the VR space experience, and the boundary 100 that enables avoidance of the objects may be automatically set each time. For example, if a VRHMD is used with a camera that takes a picture of the front, the boundary 100 that enables avoidance of the objects may be set each time the head moves and the real space image in front changes.

Figure 8:
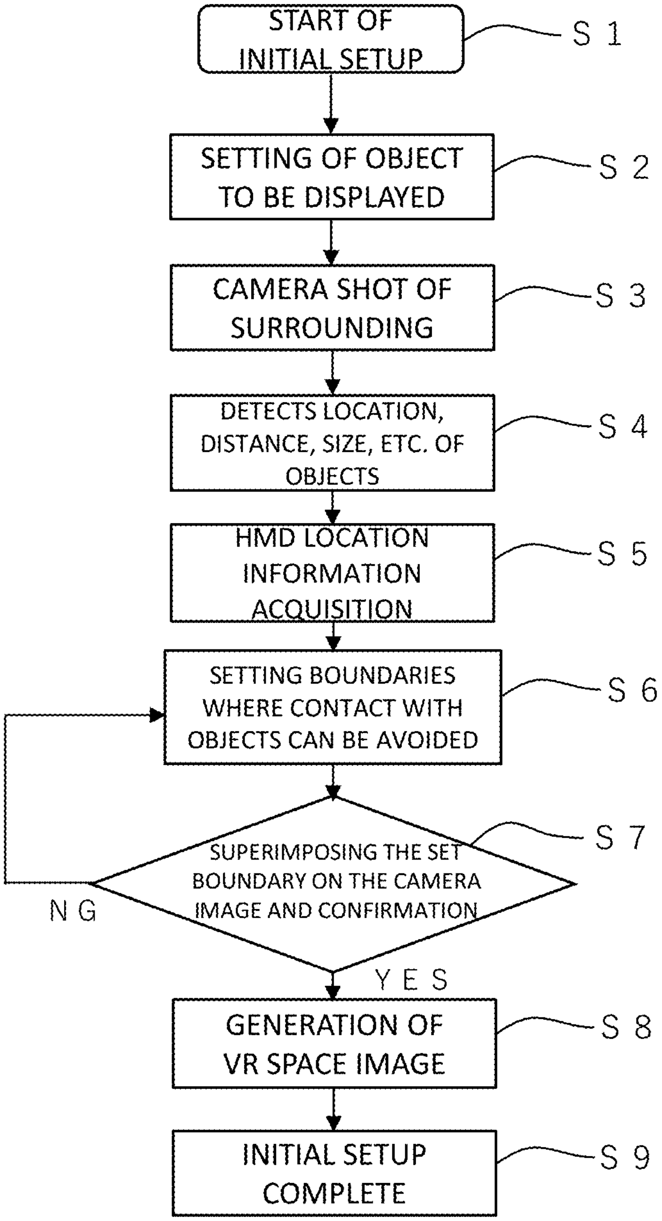
FIG. 8 is a flowchart to illustrate an example of the operation flow in the initial setup of VRHMD.

Next, with reference to FIG. 8, an example of an operational flow for setting the boundary 100 of the safety activity area is described. FIG. 8 is a flowchart for explaining an example of the operation flow in the initial setting of the VRHMD.

First, the user wears the VRHMD 1 on the head. Then, the VRHMD 1 starts the initial setup for experiencing the VR space (S1). Note that, this process may be started automatically after the VRHMD 1 is worn, or this process may be started by inputting instructions from the user using an appropriate input device.

Next, the user sets the types of objects to be grasped during the experience of the VR space, e.g., person, animal, and phone which is ringing (S2). In this setting, the number of objects may be set, for example, if the user is experiencing the VR space among a large number of person and there are more than the set number of person, the setting may be made not to grasp person. Also, it is possible to set to grasp only specific person by utilizing appropriate face recognition technology. Note that, the set information is stored in the memory.

Next, the surrounding situation of the wearer is captured by the camera 200, and a 360° image is created (S3). VRHMD 1 identifies objects (obstacles) from the created image, detects the position of the obstacles, distance to the wearer, size, etc. using data obtained by sensor 105 etc., and stores the identified obstacles, their positions, distance to the wearer, size, etc. data (S4).

VRHMD 1 acquires relative positional information to the object, based on the positions and distances of objects such as chair 4, desk 5, person 20, and wall 3 in the real space obtained in S4 (S5). And, the VRHMD 1 automatically sets the boundary 100 that can avoid contact with the objects (obstacles), based on the data obtained in S4 and S5 (S6).

The VRHMD 1 superimposes the set boundary 100 on the image of the real space captured by the camera 200 and displays it on the display 130. Here, the wearer looks at the image output to the display 130 and confirms whether the boundary 100 is appropriate (S7).

Figure 9:
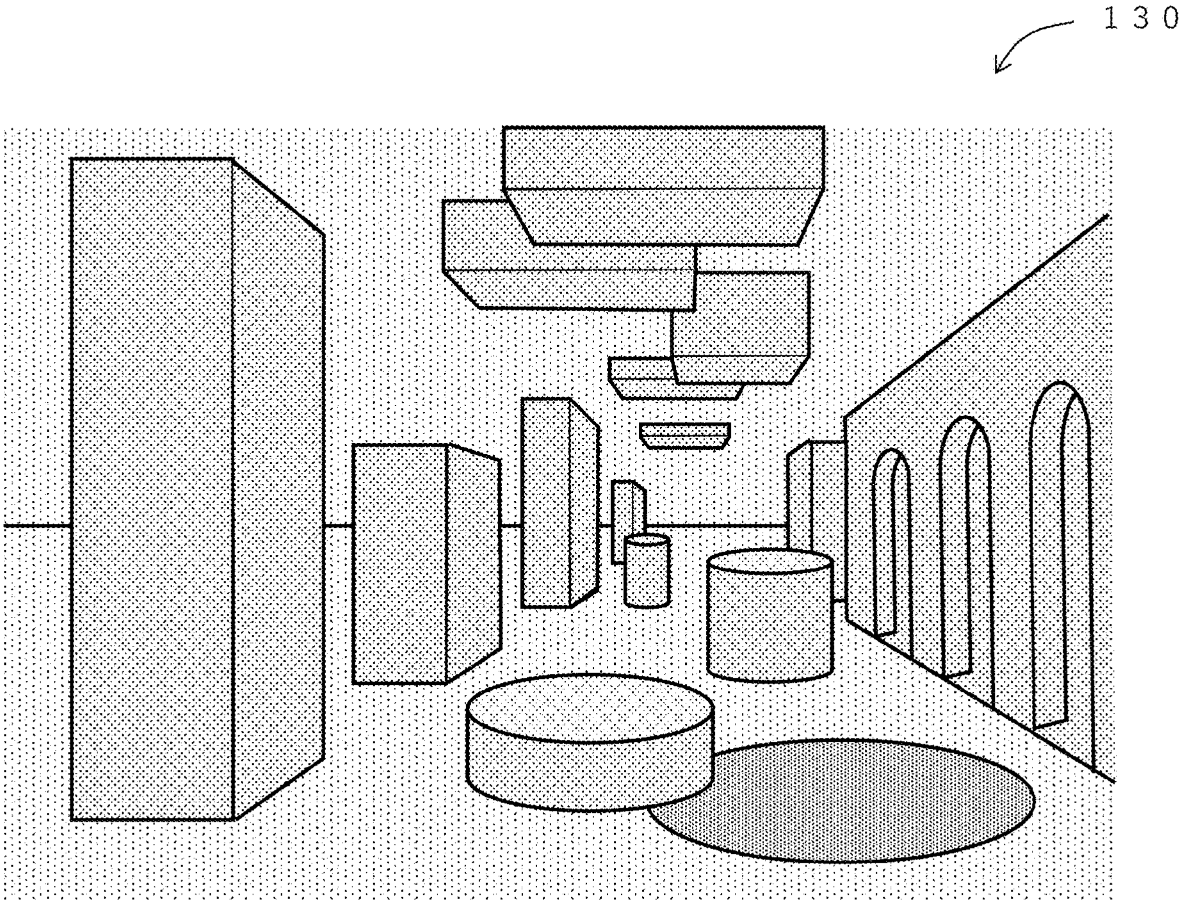
FIG. 9 is a diagram of showing an example of a VR space image displayed on the display.

If the confirmation result of S7 is OK, VRHMD 1 stores the location information of the boundary 100 and creates a VR space image (S8). The created VR space image is then displayed on the display 130 as shown in FIG. 9. On the other hand, if the confirmation result of S7 is NG, the VRHMD 1 returns to S6 and re-sets the boundary 100. Note that, the confirmation result, as an example, may be entered by the wearer via an appropriate input device. The VRHMD 1 may also process that considering the confirmation result as OK or NG by the elapse of a predetermined time period.

After the VR space image is created, the initial setup is completed (S9).

Next, an example of a display method related to the invention will be described. One of the purposes of the present invention is to enable, during the experience of the VR space, to grasp the situation around the wearer only when necessary, especially the situation that exists outside the boundary 100 of the safe activity area, without compromising the immersive experience as much as possible.

Figure 10A:
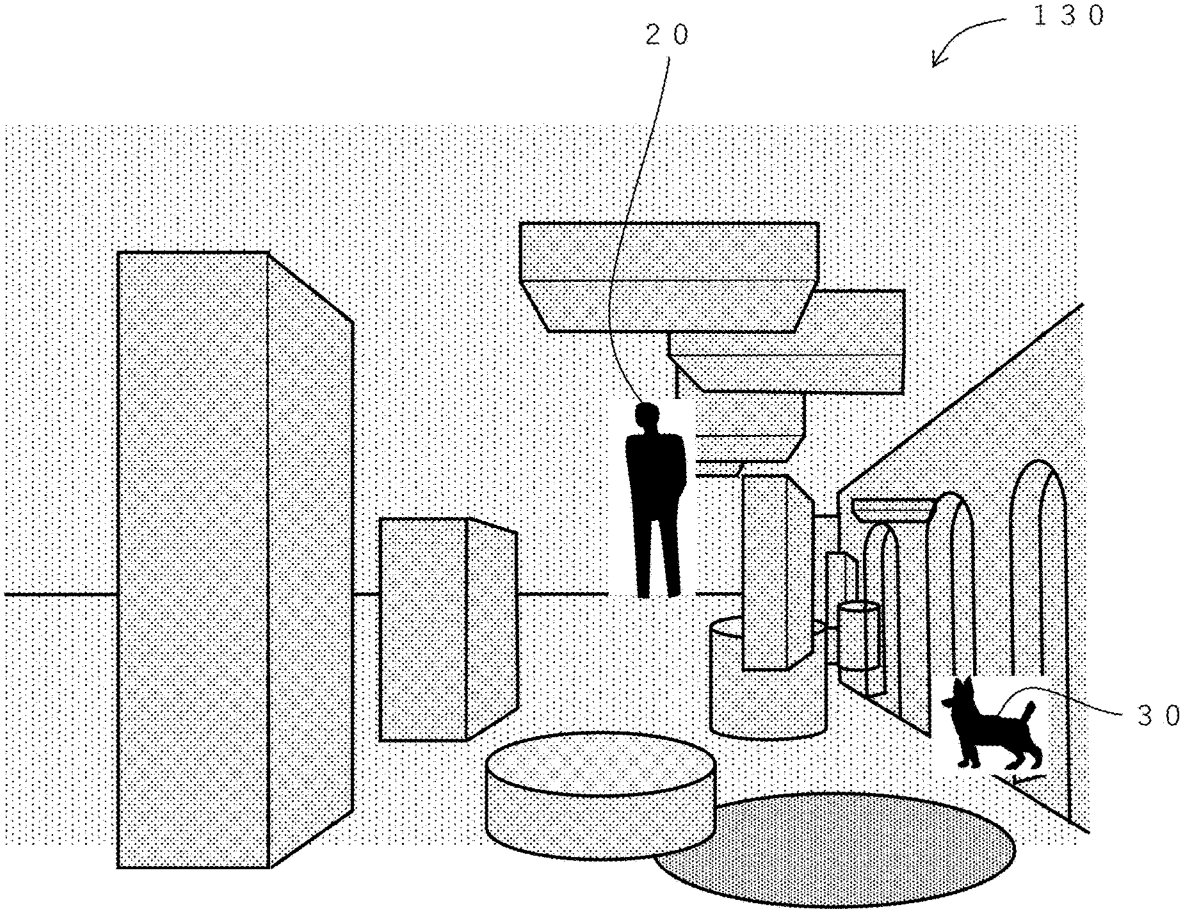
FIG. 10A is a diagram of showing an example of a VR space image displayed in which an object is superimposed.
Figure 10B:
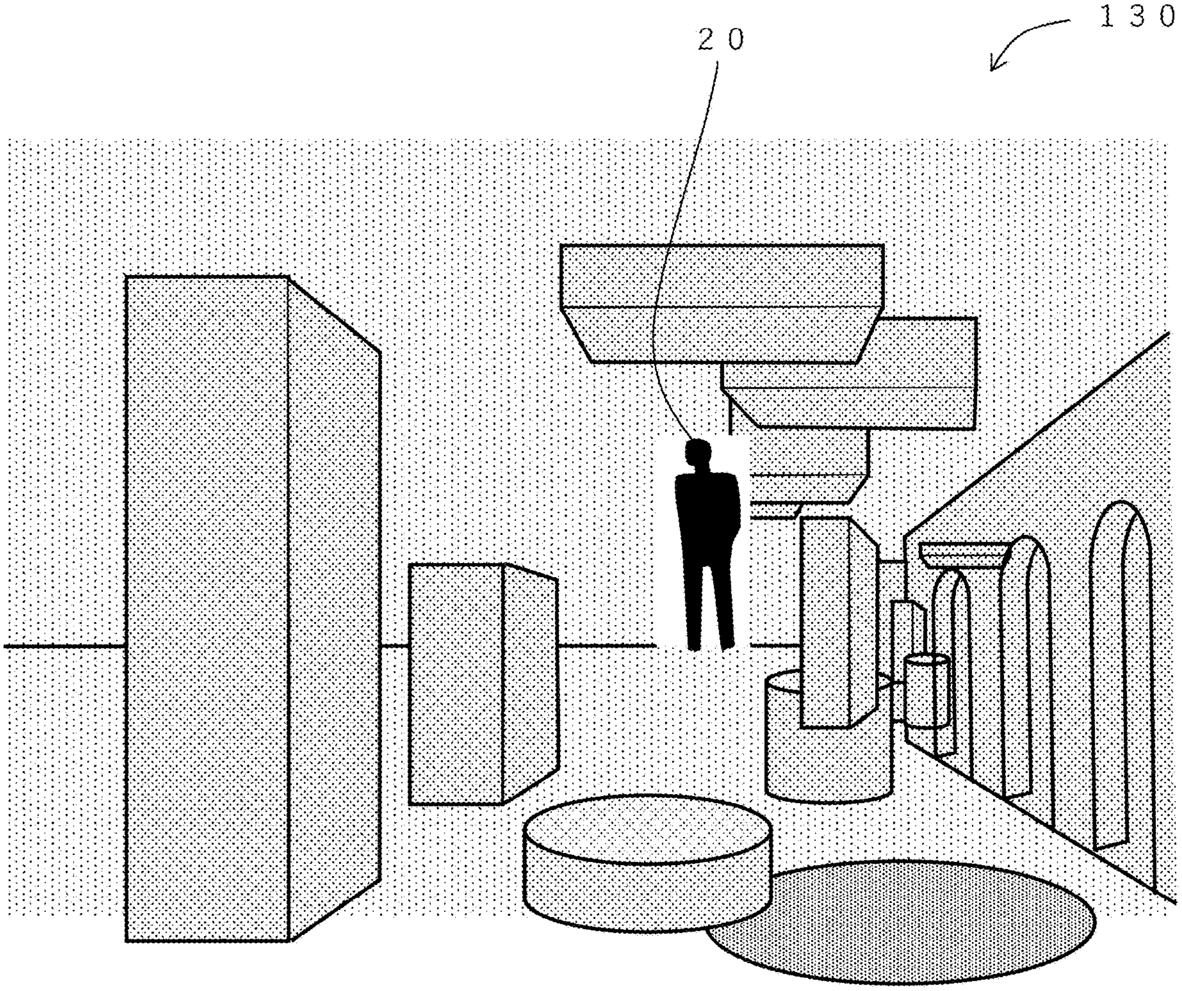
FIG. 10B is a diagram of showing an example of a VR space image displayed in which an object is superimposed.

FIGS. 10A and 10B show an example of a display form according to the first embodiment of the invention. FIGS. 10A and 10B are examples of grasping a person 20 or animal 30 that exists outside boundary 100 of the safe operation area described in FIG. 7, superimposing the person 20 or animal 30 on the VR space image shown in FIG. 9 and displaying it on the display 130.

Figure 6A:
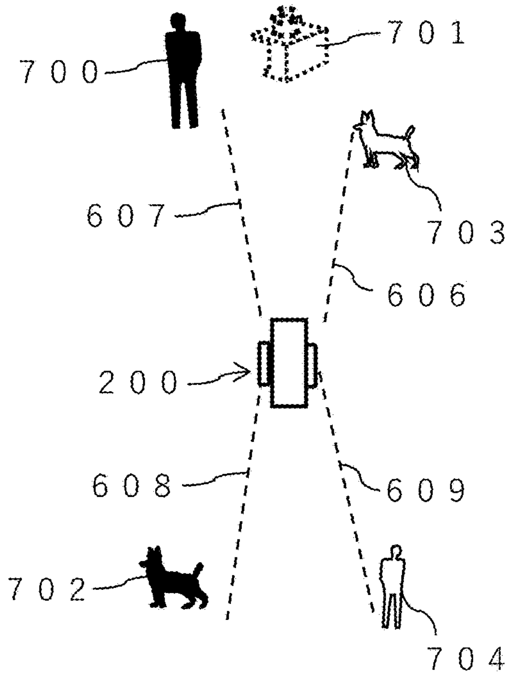
FIG. 6A is a diagram for illustrating an example of a method for acquiring an image of the surroundings.
Figure 6B:
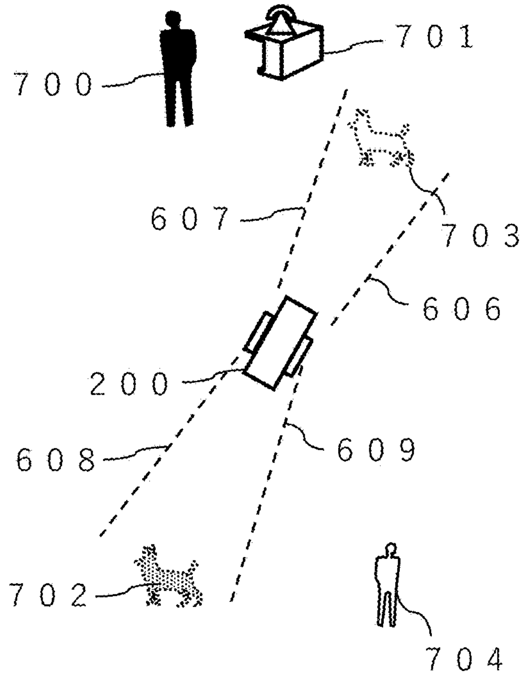
FIG. 6B is a diagram for illustrating an example of a method for acquiring an image of the surroundings.

Camera 200 continues to capture 360° ambient images as shown in FIG. 6A-6B during the VR space experience. If the VRHMD 1, during the VR experience, identifies objects that exist outside the boundary 100 from the captured ambient image, out of such as the chair 4, the desk (5, 12), the computer 6, the telephone 11, the person 20, the animal 30, the door 15, the window 7, and the wall 3, which were set in the initial setting S2, it superimposes the captured image of the person 20, animal 30, etc. on the VR space image and displays. Note that, if an object that outputs sound, such as a telephone with a ringing tone, is set, a microphone 181 that inputs sound from outside or the like may be used, in identifying the object.

FIG. 10A shows the display when the person and animals are set in S2 of the initial setup. Both the person 20 and the animal 30 exist outside the boundary 100, but because they were set in S2, these objects are superimposed and displayed in the VR space. On the other hand, FIG. 10B shows the display when only the person is set in S2, the initial setting. Both person 20 and animal 30 exist outside of boundary 100, but because only person 20 is set in S2, only person 20 is superimposed and displayed in the VR space, and animal 30 is not displayed. Thus, it is possible to display only those objects that the wearer has initially set as objects that he or she wishes to be grasp of.

Note that, if a new object that did not exist at the time of initial setup appears inside the boundary 100 from the ambient image, safe movement and operation will be hindered. For this reason, VRHMD 1, regardless of the type of new object, superimposes the captured image of the object on the VR space image and displays.

As explained above, when the VRHMD1 identifies that an object set outside the boundary 100 has newly appeared, it superimposes the captured image of the object on the VR space image and displays. This enables the wearer to grasp the external situation that wearer may wish to be aware of. On the other hand, if the object is identified as an object that has not been set, it is not displayed as long as it does not interfere with safety operations, so the sense of immersion in the VR space is not compromised. Thus, this embodiment provides a VRHMD that can display with an appropriate balance between the understanding of the surrounding situation and the sense of immersion, which are in a trade-off relationship.

Figure 11:
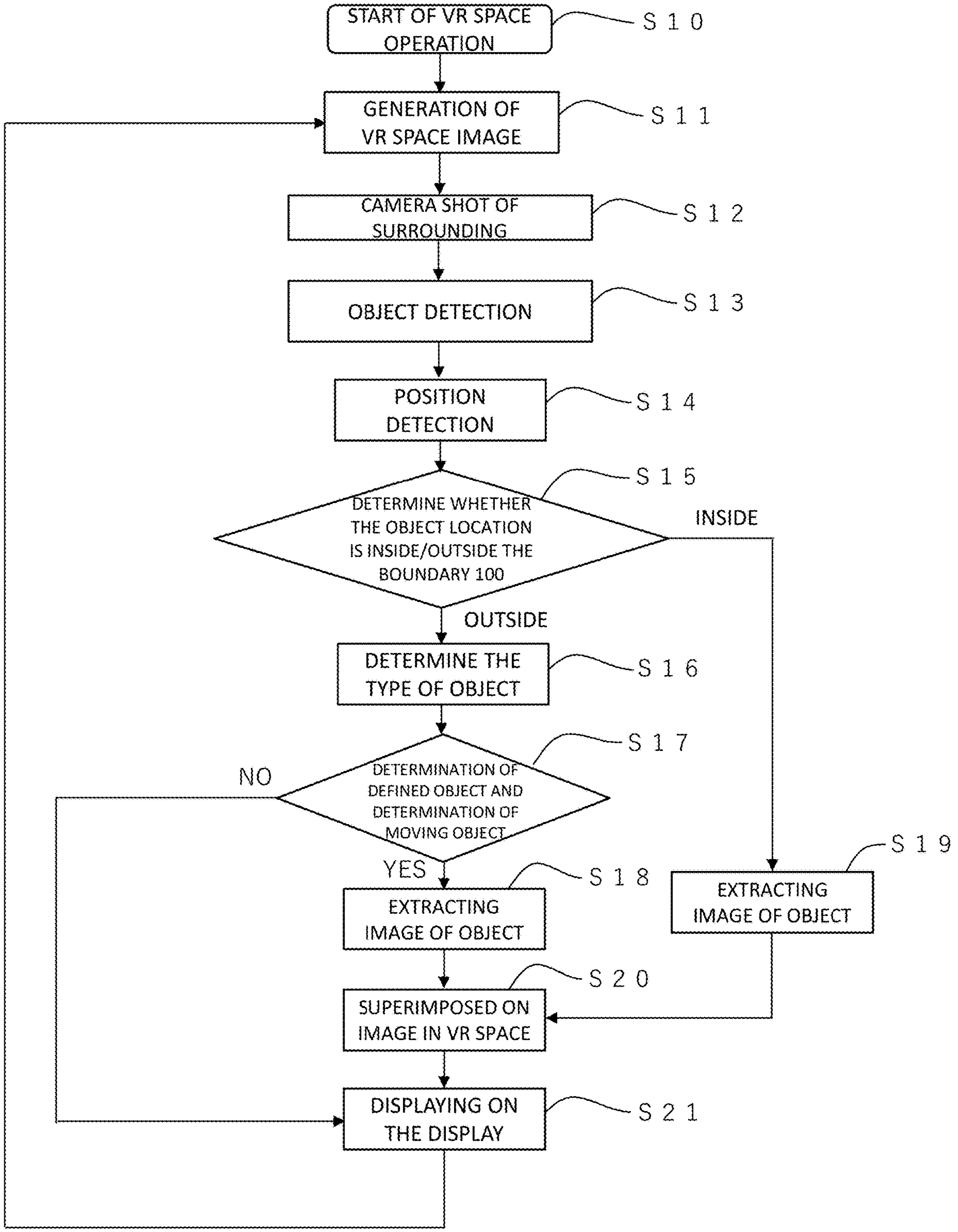
FIG. 11 relates to the first embodiment, is a flowchart to illustrate an example of the process during the operation of VRHMD.

Next, FIG. 11 is used to explain the operational flowchart for the first embodiment. FIG. 11 is a flowchart for explaining an example of a process during VRHMD operation.

When the VR space experience is started (S10), the VRHMD 1 generates the VR space image by the VR space image generator 195 of the image processor 107 (S11). Here, the VR space image is generated by the same generation method as in S8 above.

When the VRHMD 1 is used, the camera 200 captures the wearer's surroundings and creates a 360° ambient image (S12). VRHMD 1 then detects objects from the created 360° ambient image (S13). VRHMD1 identifies the location of the detected object using sensor functions such as sensor 105 as appropriate and compares it with the data detected in S4 described above. Note that, if a new object is detected, the object is stored, and if the object is moving, its direction is detected (S14). Note that, the direction in which the object is moving can be detected, as an example, using the captured images (e.g., by determining the direction in which the object is moving using captured images at short time intervals).

VRHMD 1 identifies whether the object detected in S14 and the location of the moving object are located outside or inside the boundary 100 (S15). Note that, it is assumed that the wearer is inside the boundary 100.

If the VRHMD 1 identifies that the object is outside the boundary 100 in S15, the VRHMD 1 determines the type of the object. The VRHMD 1 determines that the object is, for example, a person, animal, desk, chair, etc. (S16). The VRHMD 1, as an example, can determine the type of the object using known image matching techniques. Also, the VRHMD 1 may determine the type of object by using an appropriate matching technique based on the input sound from the object.

It is determined whether the type determined in S16 matches the type previously set in S2 of FIG. 8. For example, if a person and an animal are set in S2, VRHMD 1 extracts the person and the animal (S17).

If, in S17, the objects set in S2 are determined (YES) or moving objects are detected in S14 (YES), the VRHMD 1 acquires (extracts) images of those objects (S18). The VRHMD 1 then superimposes the images acquired (extracted) in S18 on the VR space images (S20). Also, the VRHMD 1 displays the image superimposed in S20 on the display 130 (S21). Note that, after the display in S21, the process returns to S11. On the other hand, if no object is extracted in S2 in S17 (NO), VRHMD1 displays the VR space image generated in S11 on the display 130 as is (S21). Also, if an object exists inside the boundary 100 in S15 and the object is a new object detected in S14 or moving object, VRHMD) 1 extracts their images (S19). Then, VRHMD 1 superimposes the images acquired by extraction in S19 on the VR space images (S20). Also, the VRHMD 1 displays the images superimposed in S20 on the display 130 (S21). Note that, when S19 is processed, there is a high possibility that the wearer will contact an object, so this embodiment, VRHMD 1 performs a process such as superimposing the image in S19 on the central portion of the VR spatial image or the like, or displaying the image in S19 and stopping the output of the VR spatial image.

As explained above, when it is identified that the set object has newly appeared outside the boundary 100, it superimposes a captured image of the object (in detail, an image in which the object portion is cut out from the image captured by the camera 200, or an image in which the outline of the object is extracted) on the VR space image and displays. By this, it enables to grasp the external situation that the wearer may wish to be aware of. On the other hand, if the object is identified as an object that has not been set, it is not displayed as long as it does not interfere with the safety operation, so the immersion in the VR space is not compromised. Thus, this embodiment provides a VRHMD that can display with an appropriate balance between understanding the surrounding situation and a sense of immersion, which are in a trade-off relationship.

Second Embodiment

Next, the second embodiment is described with reference to FIG. 12-13. Functions similar to those of the other embodiments are marked with the same symbols and may be omitted from the description. In the second embodiment, while experiencing the VR space, if an object to be grasped, set in S2 of FIG. 8, exists outside the boundary 100, the VRHMD 1 replaces the object with a virtual object. The VRHMD 1 then superimposes the substituted virtual object on the top, bottom, left, and right edges of the VR space image in accordance with the position where it actually exists, and displays it on the display 130.

In the second embodiment, first, the camera 200 creates a 360° ambient image, and the VRHMD 1 identifies objects from that 360° image. The VRHMD 1, in the identified object, detects the object that match the object to be grasped set in S2 in FIG. 8 (e.g., person 20 or animal 30) and exist outside the boundary 100, and identifies direction of the object location in which in front of, behind, to the right of, to the left of, or diagonally to the wearer. Then, VRHMD1 replaces the detected object with a virtual object and displays it in accordance with the direction it exists relative to the wearer's position.

Figure 12:
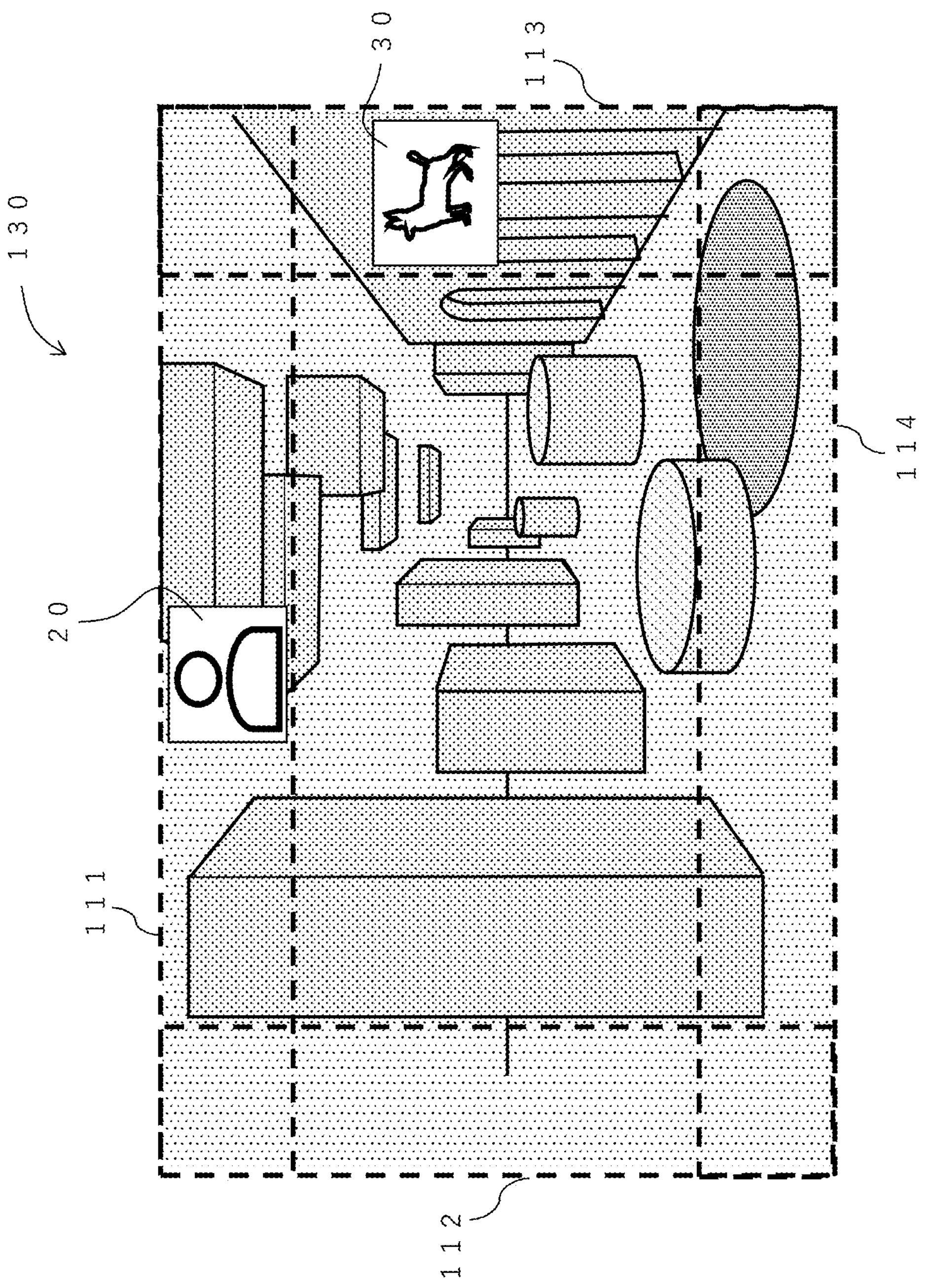
FIG. 12 is a diagram of showing an example of a VR space image displayed in which virtual objects representing objects are superimposed.

With reference to FIG. 12, an example of the display of virtual objects in this embodiment will be described. As shown in FIG. 12, VRHMD 1 superimposes and displays virtual objects of objects on the dotted line frames 111, 112, 113 and 114 at the edge of the VR space image. In this way, by displaying the object as a virtual object and at the edge of the VR space image, the wearer can grasp the surrounding situation without compromising the sense of immersion in the VR space.

Here, FIG. 12 shows the display of VRHMD 1 in the situation shown in FIG. 2. In this embodiment, since person 20 exists in front of the wearer, the virtual object of person 20 that exists in front of is displayed within the upper dotted line frame 111. Also, since animal 30 exists on the right side of the wearer, the virtual object of animal 30 that exists on the right side is displayed within the dotted frame 113 on the right. In this way, the virtual objects are displayed according to the direction in which they exist relative to the wearer's position.

Figure 13:
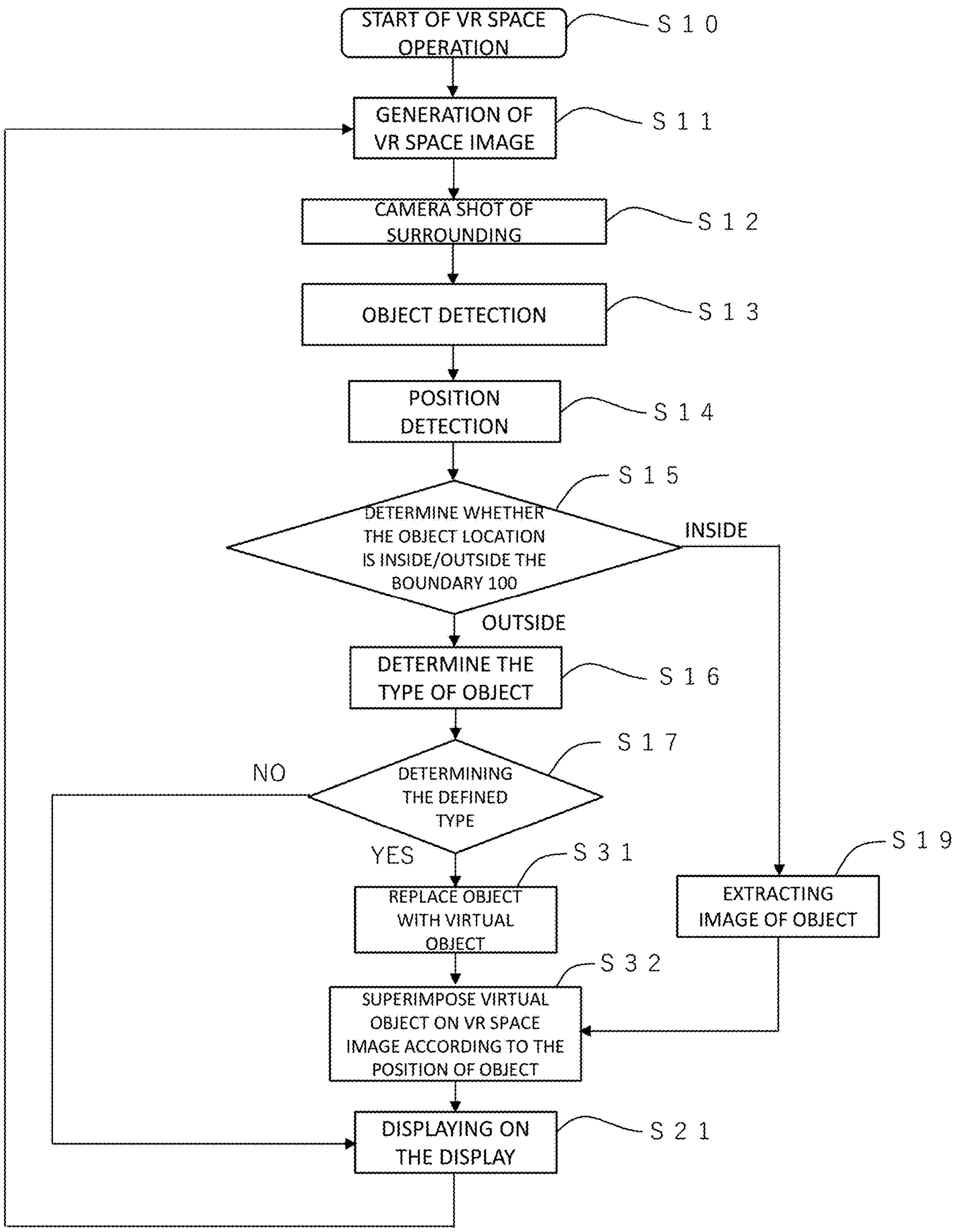
FIG. 13 relates to the second embodiment, is a flowchart to illustrate an example of the process during the operation of VRHMD.

Next, the operational flowchart of the second embodiment is described using FIG. 13. Note that, functions similar to those of the other embodiments are marked with the same symbols and may be omitted from the explanation.

First, when the VR space experience is started (S10), VRHMD 1 generates a VR space image by the VR space image generator 195 of the image processor 107 (S11). Then, camera 200 captures the wearer's surroundings to create a 360° ambient image (S12), and VRHMD 1 detects objects from the created 360° ambient image (S13).

VRHMD 1 identifies the location of the detected object using sensor functions such as sensor 105 as appropriate, in addition determines whether the object is in front of, behind, to the right, to the left, or diagonally to the wearer. Also, the VRHMD 1 compares with the data detected in S2 of FIG. 8, and if a new object is detected, the VRHMD 1 stores the object, and if the object is moving, the VRHMD 1 detects its direction of movement. (S14)

Note that, the direction of an object, as an example, may be determined by the following method. VRHMD 1 determines and processes an object located in the center portion of the left and right side in the captured image, as an object located in the same direction as the camera 200 (e.g., forward or backward), and an object located on the left and right edge in the captured image, as an object located in the lateral direction (e.g., left side or right side). Then, VRHMD 1 determines and processes the object located in the middle them in the captured image as an object located in the diagonal direction.

VRHMD 1 identifies whether the location of the object detected in S14 and the moving object are outside or inside the boundary 100 (S15). Note that, here, the wearer is inside the boundary 100. Then, if the object exists outside the boundary 100 in S15, the VRHMD 1 determines the type of the object (S16).

VRHMD 1 determines whether the types determined in S16 match the types previously set in S2 in FIG. 8, for example, if person and animal are set in S2, it extracts n and animal (S17) If the objects set in S2 are extracted in S17 (YES) or new objects are detected in S14 (YES), VRHMD 1 replaces those objects with virtual objects. Here, VRHMD 1 can, for example, replace with human-shaped object if it is person, or animal-shaped object if it is animal (S31). Note that, the method of replacement is not limited to the aforementioned method. Also, the object may be any shape that can be identified the object.

As shown in FIG. 12, VRHMD 1 superimposes the image replaced by the virtual object in S31 on the dotted frame (111-114) portion of the VR space image, in accordance with the direction to the wearer detected in S14 (S32). VRHMD 1 then displays the image superimposed in S32 on the display 130 (S21). After the display in S21, the process returns to S11.

On the other hand, if the object set in S2 is not extracted (no match) in S17 (NO), VRHMD 1 displays the VR space image generated in S11 on the display 130 as is (S21). Also, if an object exists inside the boundary 100 in S15 and the object is a new detected in S14 or moving object, the VRHMD 1 extracts their images (S19). Note that, since there is a high possibility that the wearer will contact the objects in the S19 image, in this embodiment, VRHMD 1 superimposes the S19 image on the part of the VR space image that is not the dotted frame 111 (e.g., the center part), or displays the real space together with the S19 image instead of the VR space image, thereby it performs to process such as interrupting immersing the VR space.

As explained above, when it is identified that a set object has newly appeared outside the boundary 100, it superimposes the object on the VR space image as the virtual object and displays. By this, it enables to grasp the external situation that the wearer may wish to be aware of. On the other hand, if the object is identified as an object that has not been set, it is not displayed as long as it does not interfere with the safety operation, so the immersion in the VR space is not compromised. Thus, this embodiment provides a VRHMD that can display with an appropriate balance between understanding the surrounding situation and a sense of immersion, which are in a trade-off relationship.

Third Embodiment

Next, the third embodiment is described with reference to FIG. 14-15. Functions similar to those of other embodiments are marked with the same symbols and may be omitted from the description. In the third embodiment, VRHMD 1 grasps objects that are generating sound, such as a telephone, and indicates that sound is being generated.

As already explained, VRHMD 1 can grasp the presence of an object such as a telephone and its location, using the 360° ambient image captured by camera 200. On the other hand, to detect that the grasped object is generating sound (e.g., the ringing of a telephone or the sound of a person speaking), sound detection processing is required.

Figure 14:
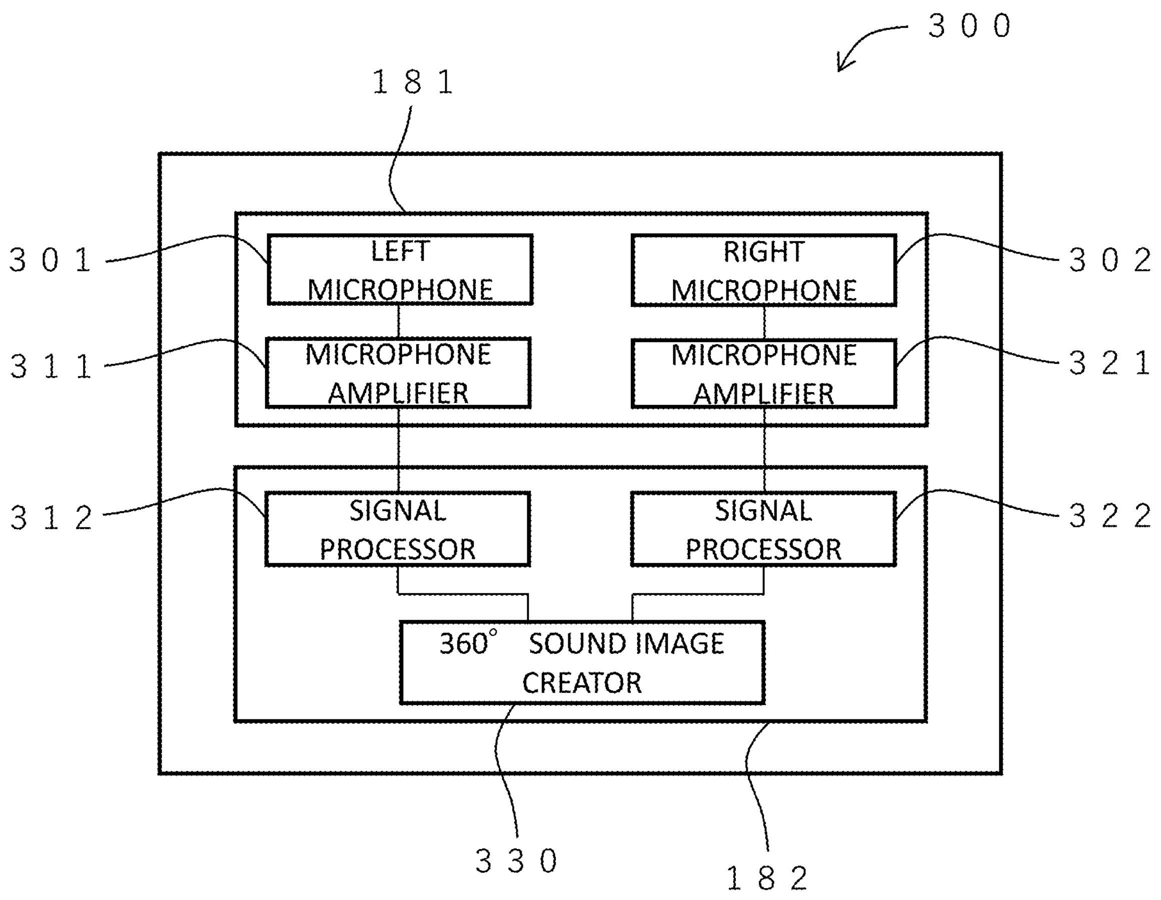
FIG. 14 relates to the third embodiment, is a diagram of showing an example of a sound detection processor hardware configuration.

FIG. 14 shows an example of the hardware configuration of the sound detection processor 300 in this embodiment. The sound detection processor 300 includes the microphones 181 of the sound processor 108 shown in FIG. 3, and the codec 182 (sound processing apparatus). The microphone 181 consists of a left microphone 301, a left microphone amplifier 311 (microphone amplifier 311), a right microphone 302, and a right microphone amplifier 321 (microphone amplifier 321). The codec 182 consists of left signal processor 312, right signal processor 322, and 360° sound image creator 330. The signal processor (312, 322) performs signal processing on the sound collected by the two left and right microphones (301, 302) to generate digital signals. The 360° sound image creator 330 creates a sound image and generates data to determine the direction of sound generation and the type of sound (e.g., telephone ring tone, human voice).

Figure 15:
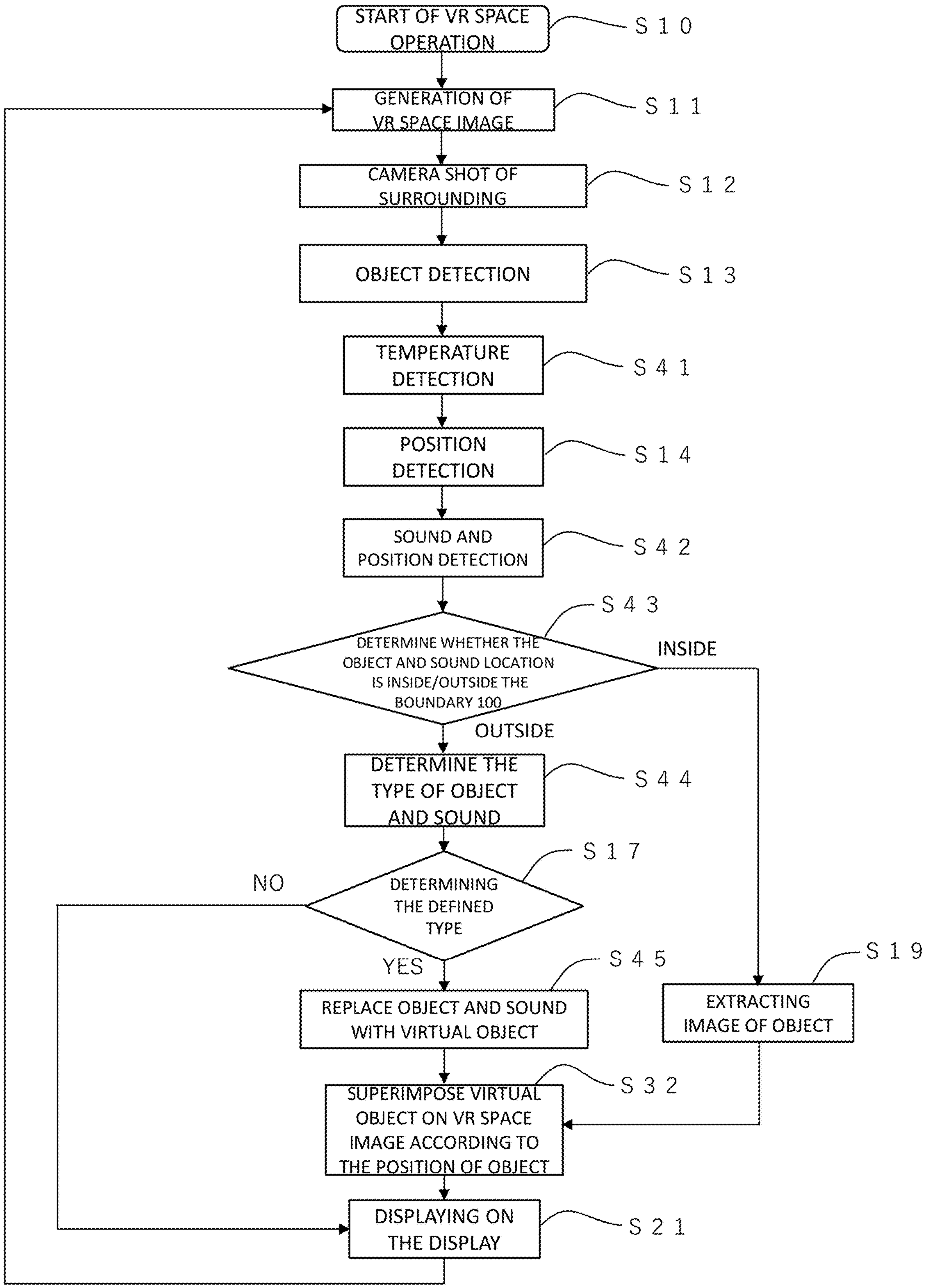
FIG. 15 relates to the third embodiment, is a flowchart to illustrate an example of the process during the operation of VRHMD.

FIG. 15 is used to illustrate an example of the operation flow of the third embodiment. FIG. 15 is a flowchart for explaining an example of a process during VRHMD operation. In the third embodiment, VRHMD 1 determines sounds and prevents misclassification between mannequin doll and person, and stuffed animal and animal. Note that, functions similar to those in other embodiments may be marked with the same symbol and omitted from the explanation.

When the VR space experience begins (S10), the VRHMD 1 generates a VR space image (S11). Camera 200 captures images of the wearer's surroundings, and VRHMD 1 creates a 360° ambient image (S12). VRHMD 1 detects objects from the created 360° ambient image (S13).

VRHMD 1 measures the temperature of the object detected in S13 with the temperature sensor 156 and compares it with the data detected in S4 of FIG. 8, to discriminate between a mannequin doll and a person having body temperature, or a stuffed animal and an animal having body temperature (S41). If the VRHMD is not equipped with a temperature sensor, S41 is skipped.

VRHMD 1 identifies the position for the object detected in S13, and in addition determines whether the object exists in front of, behind, to the right of, to the left of, or diagonally to the wearer. Also, if a new object is detected as a result of comparison with the data detected in S4 of FIG. 8, VRHMD 1 stores the object and, if the object is moving, detects its direction of movement (S14).

VRHMD 1 detects the position where the sound is generated based on the data of the sound detection processor 300, and compares the output data of S14 with the data detected in S4 of FIG. 8 to determine the object that is generating the sound. Also, in some cases, such as when an emergency bell is ringing, the sound generating position may be recognized as a mere wall. In this case, VRHMD 1 determines that no corresponding object is found as the sound source (S42). Note that, the image of the camera 200 may be used to discriminate the object generating the sound.

VRHMD 1 identifies whether the output data of S42 relates to objects that exist outside or inside the boundary 100 (S43). Here, the wearer is inside the boundary 100.

If the presence of an object or the occurrence of a sound is outside the boundary 100 in S43, VRHMD 1 determines the type of object and sound. VRHMD 1 determines for example, a ringing telephone, a person's voice calling out, a chime announcing a visitor, or an emergency bell (S44).

VRHMD 1 determines whether the type determined in S24 matches the type previously set in S2 of FIG. 8. VRHMD 1 extracts, for example, a telephone with a ringing tone set in S2, a person's voice calling out, or a chime announcing a visitor (S17).

if the objects set in S2 are extracted in S17 and if moving objects are detected in S14 (YES), VRHMD 1 replaces those objects and sounds with virtual objects. if it is a telephone that is ringing, VRHMD 1, for example, may replace to an object in the shape of the telephone that being called. Similarly, if it is a person who is calling, it can be replaced with an object in the shape of a person who is recognized to be calling, if it is a chime that announces a visitor, it can be replaced with an object in the shape of a door chime that is recognized the chime is ringing, and if an emergency bell is ringing, it can be replaced with an emergency bell virtual object (S45).

VRHMD 1 superimposes the image replaced by the virtual object in S45 on the dotted frame 111 portion of the VR space image in accordance with the direction to the wearer detected in S14. If it determines that no corresponding object is found, such as when an emergency bell is ringing, in S44, VRHMD 1 may switch from the VR space image to the real space image. Furthermore, the virtual object of the emergency bell may be superimposed on the real space image and displayed to warn of danger (S32). Note that, the operations after S32 are the same as those in the flowchart in FIG. 13 above, so the explanation is omitted.

As explained above, when a sound is generated that the wearer should be informed of, even if no new object appears, a virtual object indicating the generated sound is superimposed on the VR space image and is displayed. By this, it enables to grasp the external situation that the wearer may wish to be aware of. On the other hand, if the sound is identified as less necessary, it is not displayed, so the sense of immersion in the VR space is not compromised. Thus, according to this embodiment, a VRHMD that can display with an appropriate balance between the understanding of the surrounding situation and the sense of which are in a trade-off relationship, is immersion, provided.

Fourth Embodiment

Figure 16:
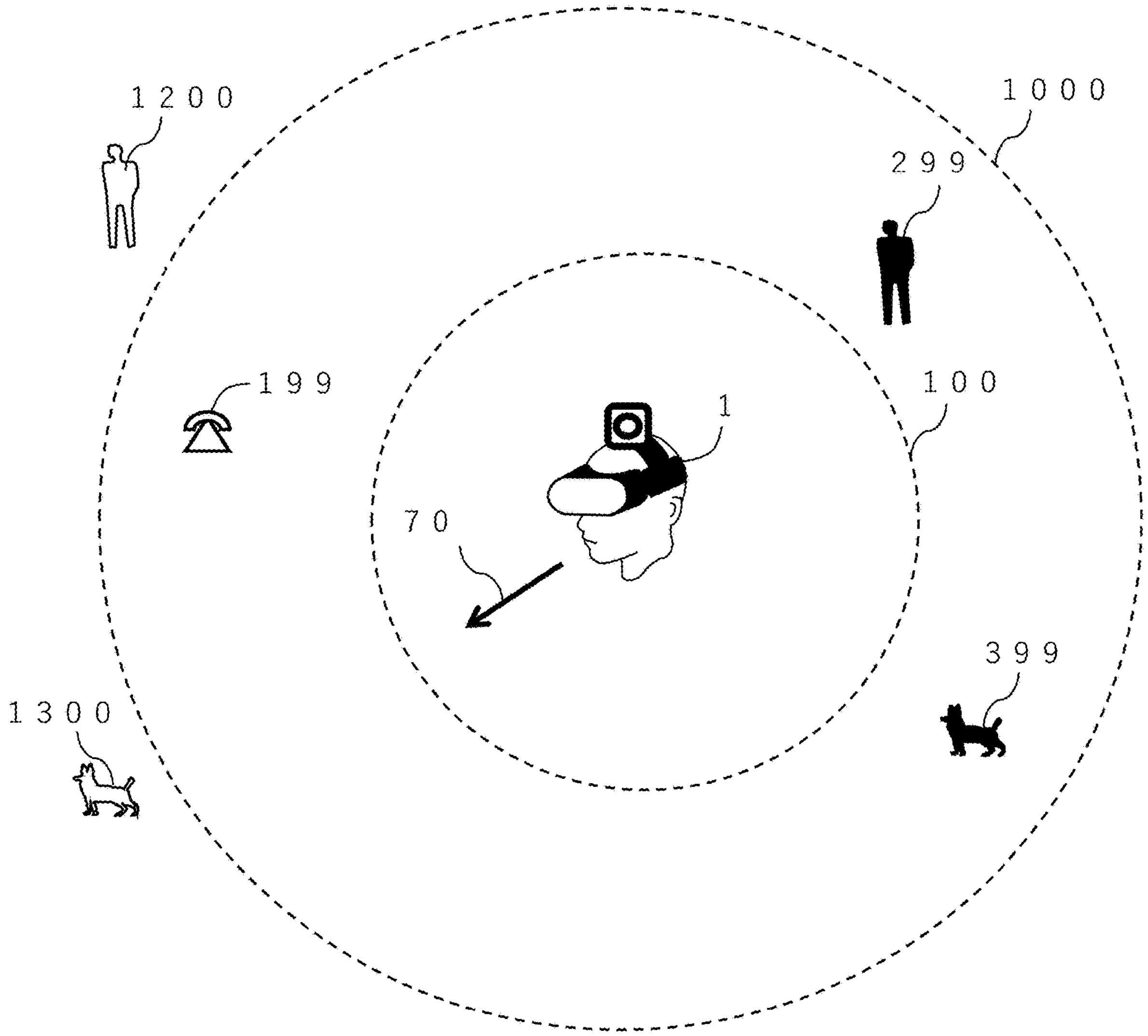
FIG. 16 relates to the fourth embodiment, is a diagram showing an example of setting a boundary.

Next, fourth embodiment is described with reference to FIG. 16-17. Functions similar to those of the other embodiments are marked with the same symbols and may be omitted from the explanation. FIG. 16 shows a further boundary 1000 outside the boundary 100 of the safe operating area. In FIG. 16, the inside of boundary 100 is considered the first area, the area between boundary 100 and boundary 1000 is considered the second area, and the area outside of boundary 1000 is considered the third area, with the wearer of VRHMD 1 facing in the direction of arrow 70. FIG. 16 also shows an example where person 299, animal 399, and ringing phone 199 are in the second area, and person 1200 and animal 1300 are in the third area. Then, when setting the boundaries in S6 of the flowchart shown in FIG. 8, two boundaries, boundary 100 and boundary 1000, are set. In other words, in this embodiment, VRHMD 1 sets the boundary 100 for the distance (first distance) at which the object is displayed regardless of the type condition, and the boundary 1000 at the distance (second distance) at which the object is displayed only when the type condition is met. Note that, this description is an example, and needless to say, there is no limit to the number of boundary settings.

In the fourth embodiment, when objects to be grasped exist in the set first area, second area, and third area 3 as set in S2 of FIG. 8, VRHMD 1 determines whether to display objects existing in each area, and superimposes and displays on the VR space image. FIG. 17 shows an example of the display in VRHMD 1 in the case where an object exists as shown in FIG. 16.

Figure 17:
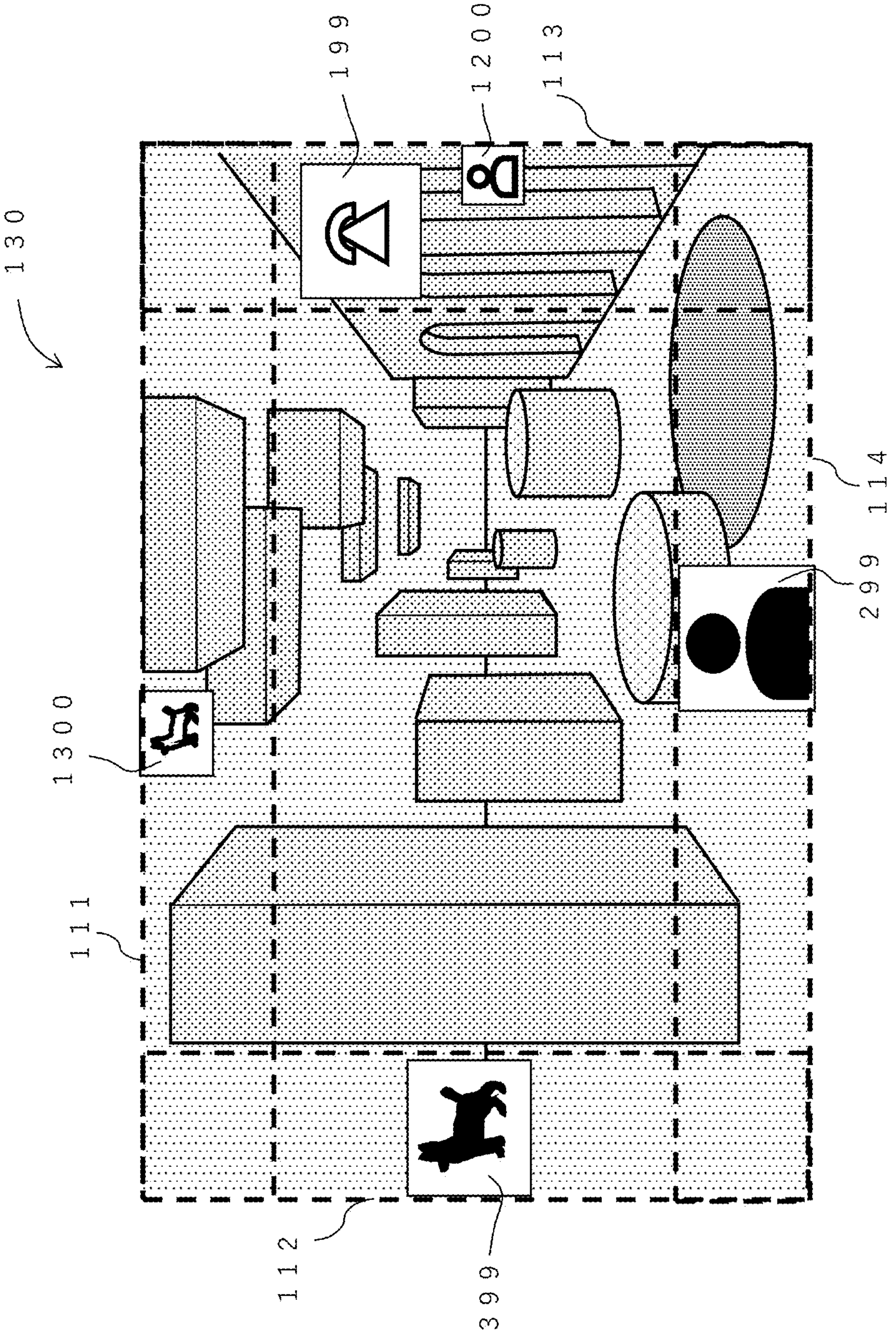
FIG. 17 is a diagram of showing an example of a VR space image displayed in which virtual objects representing objects are superimposed.

In FIG. 17, as in FIG. 12, VRHMD 1, during experiencing the VR space, replaces the object to be grasped, which was set in S2 of FIG. 8, the object to virtual object, and superimposes and displays on the portion indicated by the dotted line frames 111, 112, 113 and 114 at the top, bottom, left and right ends of the VR space image according to the position where it exists. As illustrated in FIG. 17, the person 299 that exists behind is displayed with the object superimposed on the lower dotted line frame 114. Similarly, the objects are displayed and superimposed on each other, where the animal 399 existing on the left is on the dotted frame 112 on the left, the person 1200 existing on the right and the telephone 199 with a ringing tone are on the dotted frame 113 on the right, and the animal 1300 existing in front is on the dotted frame 111 on the top. By superimposing the size of the objects of person 299 and animal 1300 present in the second area larger than the size of the objects of person 1200 and animal 1300 present in the third area, the wearer can recognize the area where the objects are present.

With respect to this process, VRHMD 1 determines whether the object or sound exists in the second or third area at S16 and S44 of the operational flowchart above. Then, VRHMD 1 changes the size of the object to be superimposed according to the area in which it exists in S32.

Note that, the setting for grasping objects in the second area may be limited to objects generating sound, for example. By setting in this way, when the VR space experience is being conducted in a large space such as a gymnasium, the space that the wearer wants to grasp can be limited to a certain (e.g., several meters) circumference of the wearer. Also, it has feature that can grasp only emergency bells or broadcasts announcing an emergency in an area beyond a certain area, for example, outside a gymnasium etc., in the event of a fire or other emergency situation.

As explained above, multiple areas separated by boundaries are set, and virtual objects corresponding to the areas where objects exist are superimposed on the VR space image and are displayed. This enables recognition of objects according to their distance from the wearer. On the other hand, if there is no problem with safe operation, it does not perform display, in addition, if the distance is too great, the virtual object can be displayed inconspicuously, so that the immersion in the VR space is not compromised. Thus, this embodiment provides a VRHMD that can display with an appropriate balance between understanding the surrounding situation and immersion, which are in a trade-off relationship.

Fifth Embodiment

Next, the fifth embodiment is described with reference to FIG. 18-20. Functions similar to those of the other embodiments are marked with the same symbols and may be omitted from the explanation. The fifth embodiment describes an example of processing using data obtained from communications.

There are many devices with short-range communication interfaces (wireless communication devices), e.g., smartphones. This short-range communication interface uses radio waves and is assumed to be used in short distances, up to a communication distance of about 10 meters. This short-range communication interface transmits ID information periodically, and because it uses radio waves, it can be detected even if it is located behind a wall or in other places where it cannot be seen by the eye.

Figure 18:
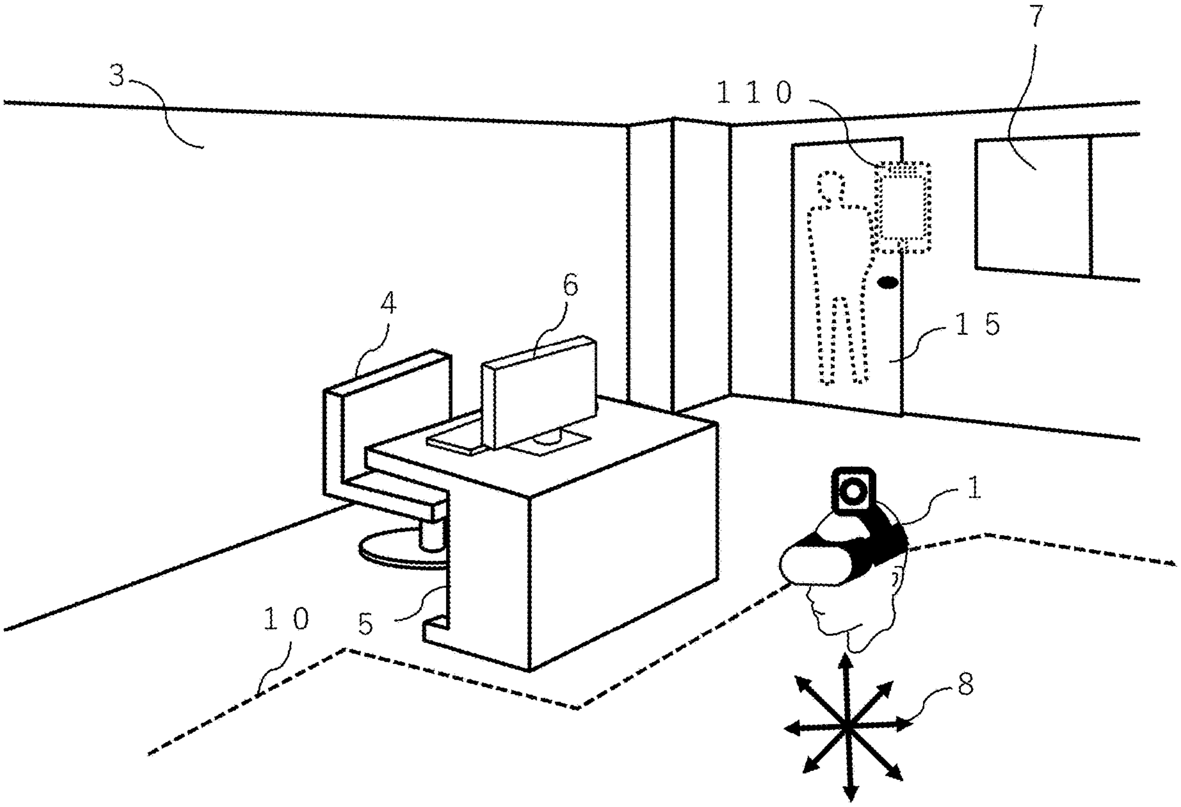
FIG. 18 relates to the fifth embodiment, is a diagram used to illustrate an example of a method for detecting objects that exist outside the field of view.
Figure 19:
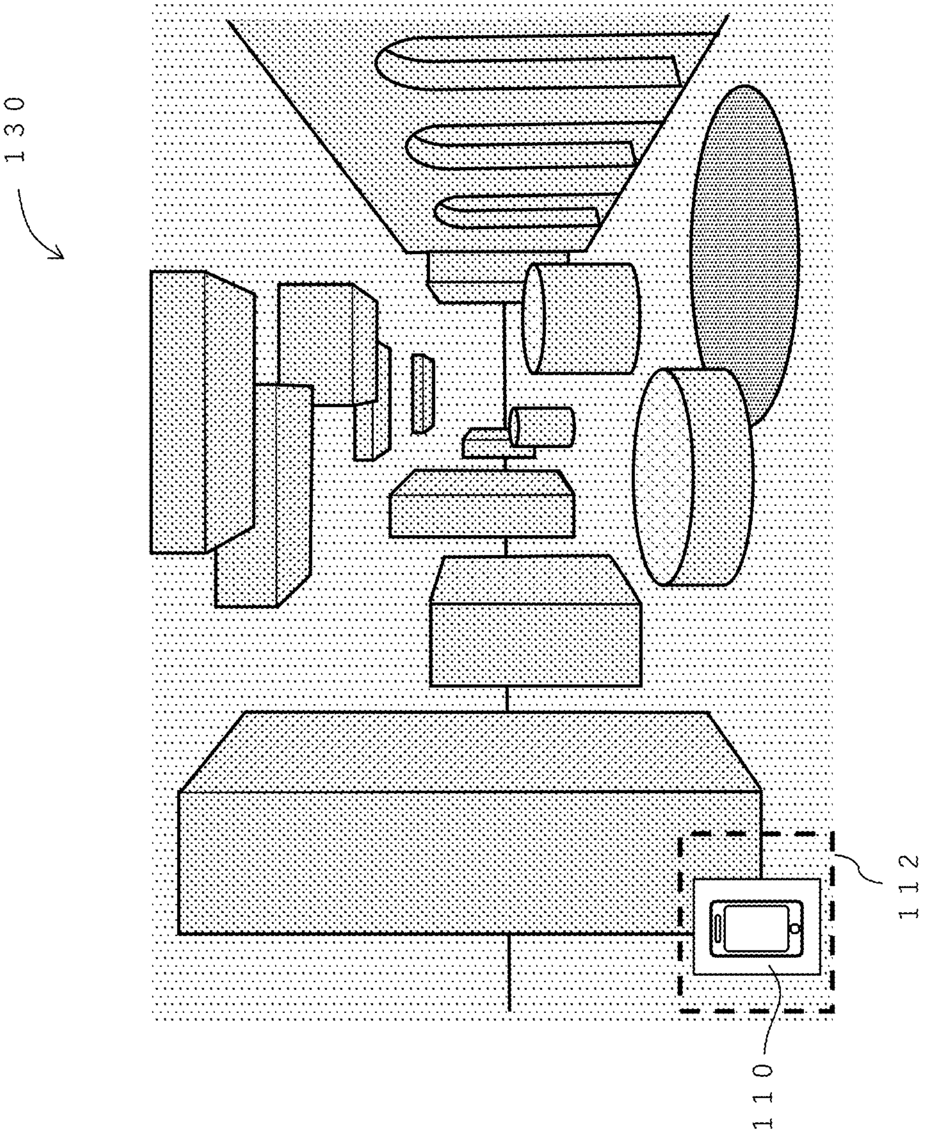
FIG. 19 is a diagram of showing an example of a VR space image displayed in which virtual objects representing objects are superimposed.

Thus, for example, as shown in FIG. 18, VRHMD 1 can discover a smartphone 110 with a short-range communication interface that is present outside of door 15. Here, FIG. 18 shows a situation where a person possessing the smartphone 110 having a short-range communication interface is present outside the door 15. Then, the VRHMD 1 can display on the display 130, as shown in FIG. 19, that the person carrying this smartphone 110 is present around the wearer during the VR space experience, with the smartphone object 110 superimposed on the dotted frame 112 in the lower left part of the VR space image.

Figure 20:
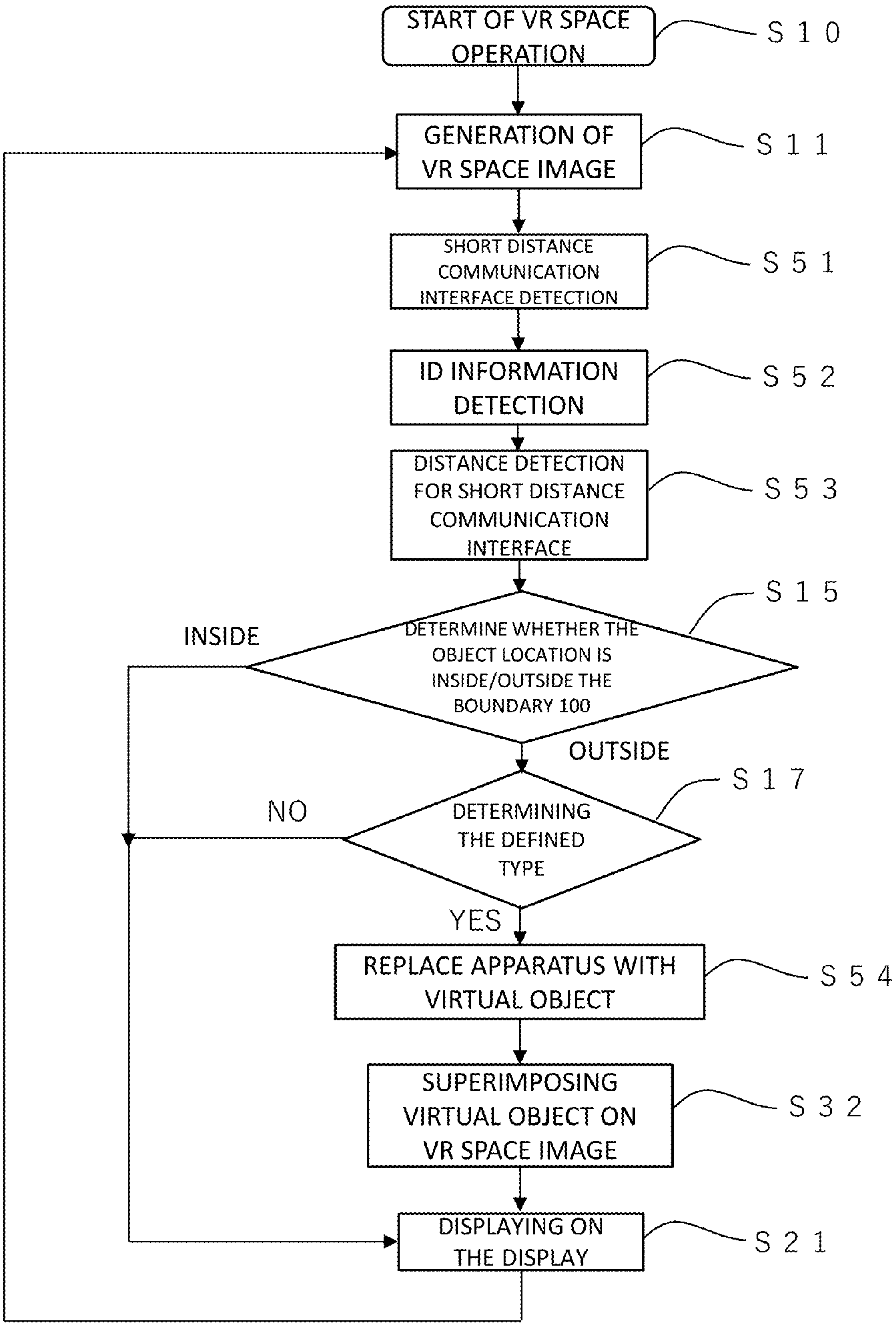
FIG. 20 relates to the fifth embodiment, is a flowchart to illustrate an example of the process during the operation of VRHMD.

FIG. 20 is used to describe an example of the operation flow of the fifth embodiment. FIG. 20 is a flowchart for explaining an example of a process during VRHMD operation. Functions similar to those of other embodiments are marked with the same symbols and may be omitted from the explanation.

When the VR space experience begins (S10), VRHMD 1 generates VR space images (S11).

The short-range communication interface periodically transmits ID information. Therefore, VRHMD 1 detects the short-range communication interface by acquiring radio waves from the short-range communication interface (S51). VRHMD 1 also detects ID information from the acquired radio waves (S52).

Also, VRHMD 1, as an example, detects (estimates) the distance of a device equipped with a short-range communication interface from the acquired radio wave strength (S53). Note that, the VRHMD 1 may detect (estimate) the distance of a device equipped with a short-range communication interface from the delay time in communication. In addition, as an example, if a direction detectable method such as UWB (Ultra Wide Band) is used, position detection is also possible.

VRHMD 1 determines whether the location of the device detected in S53 is outside or inside the boundary 100 (S15). If the device is inside the boundary 100 in S15, the process proceeds to S21. Note that the VRHMD 1 may make a determination not simply based on the distance, but may also detect whether the device is approaching or moving away and take that information into account when making the determination. For example, if the device is outside the boundary 100 in terms of distance but is moving away, the VRHMD 1 may determine that there is little need to inform the wearer and the process may proceed to S21.

If the device exists outside the boundary 100 in S15, it determines whether the detected ID information matches the device to be grasped set in S2 in FIG. 8 (S17). Note that, for the setting in S2, the user can, for example, select and register the device whose proximity he/she wants to be grasped, from the list of devices with short-range communication interfaces detected in the past.

If the device is determined in S17 (Yes), the VRHMD 1 replaces the determined device with a virtual object (S54). Then, VRHMD 1 superimposes the object in S54 on the dotted frame 112 in the lower left part of the VR space image (S32), as shown in FIG. 20.

Note that, although the example of superimposing the object of S54 on the portion of the dotted frame 112 was described in this embodiment, the display form is not limited to this example, and for example, the position of the dotted frame to be displayed may be changed as appropriate. Also, if the direction of the device can be identified, a display that aligned the direction for the wearer, may be performed, as described in FIG. 12 above. Also, the device type is categorized, and a display summarized by device type may be performed.

As explained above, it uses the short-range communication interface to detect target device, superimposes virtual objects on the VR space image, and displays. By this, it possible to recognize of detect target device even in locations where it is not possible to photograph with a camera. On the other hand, devices that are not registered as detection targets are not displayed, so the sense of immersion in the VR space is not compromised. Thus, according to this embodiment, a VRHMD that can display with an appropriate balance between understanding the surrounding situation and immersion, which are in a trade-off relationship, is provided.

Sixth Embodiment

Next, the sixth embodiment is described with reference to FIG. 21. Functions similar to those of other embodiments are marked with the same symbols and may be omitted from the description. The sixth embodiment describes an example of a VRHMD using a smartphone.

Figure 21:
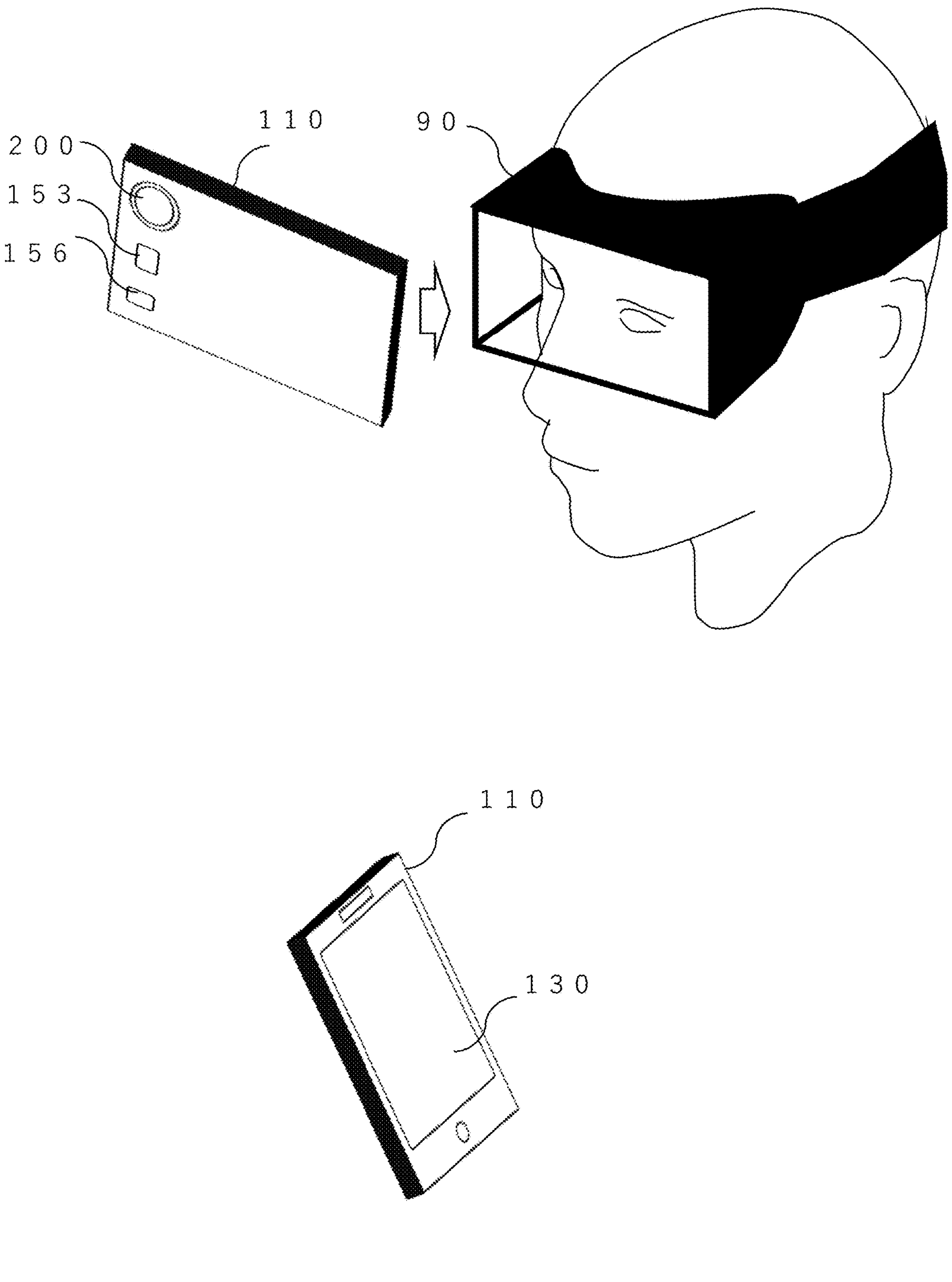
FIG. 21 relates to the sixth embodiment, is a diagram for illustrating an example of an aspect in which a smartphone is used.

As shown in FIG. 21, VRHMD 1 may be a VR goggle 90 with a smartphone 110. Then, the VRHMD 1 may perform the same process using the camera 200 on the back side of the smartphone 110, the distance sensor 153, the temperature sensor 156, and the display 130 on the front side of the smartphone 110.

Here, the VR goggles 90 are of an appropriate configuration to which the smartphone 110 is attached. the VR goggles 90 may be, as an example, sumaho goggles to which the smartphone 110 is attached by the user fitting the smartphone 110. The VR goggles 90 may also be sumaho goggles in which the smartphone 110 is attached by the user plugging in the smartphone 110. Here, "sumaho" is an abbreviation for smartphone.

The above description, it provides a VRHMD that recognizes the type of object from the image captured by the camera 200, extracts objects that match the type conditions and distance conditions, superimposes an image showing the extracted object on the VR space image, and displays on the display 130. Also, as an example, the method of displaying head mounted display that includes a memory step (S2) to store the type conditions and distance conditions of the object to be displayed, an image generation step (S11) to generate an image drawing the virtual space, a shooting step (S12) to capture the real space around the head mounted display, a distance detection step (S14) to detect the distance to object in the real space, a recognition step (S16) to recognize the type of object from the captured image, an extraction step (S17, S18) to extract objects that match the type conditions and distance conditions from the recognized object, and a superimposed display step (S20, S21) to superimpose images showing the extracted object on the virtual space image and to displays, is provided.

In this way, even outside the safe activity area of the VRHMD wearer, surrounding situations such as people, equipment, and sounds can be detected, and it can be determined whether it is desirable to make the situation known to the wearer. If it is determined that it should be made inform, regarding the detected situation, it superimposes such as an image taken of the detected object, a virtual object indicating the object, or a display object of the direction of the object's existence, on the VR space image and displays on the display. By this, it enables to grasp the external situation that the wearer may wish to be aware of. On the other hand, if an object is identified as an object that has not been set, it is not displayed as long as it does not interfere with safety operations, so the immersion in the VR space is not compromised. Thus, according to the present invention, it can display with an appropriate balance between understanding the surrounding situation and immersion, which are in a trade-off relationship.

Above, an embodiment of the invention has been described, needless to say, the configuration for realizing the technique of the present invention is not limited to the above-described embodiment, and various modifications are possible. For example, the aforementioned embodiments are described in detail in order to explain the invention in an easy-to-understand and it is not necessarily limited to those having all the described configurations. It is also possible to replace some of the configurations of one embodiment with those of another embodiment, and it is also possible to add configurations of other embodiments to those of one embodiment. All of these are within the scope of the invention. In addition, the numerical values, messages, etc.

that appear in the text and figures are only examples, and it does not impair the effect of the invention if the use of different ones.

It is sufficient to be able to perform the prescribed processing, for example, the programs used in each processing example may be each independent programs, or multiple programs may constitute a single application program. In addition, the order in which each process is performed may be changed.

The functions, etc., of the invention described above may be realized in hardware by designing some or all of them, for example, in an integrated circuitry. They may also be realized in software by having a microprocessor unit, CPU, or the like interpret and execute an operating program that realizes the respective functions, etc. Also, the scope of software implementation is not limited, and hardware and software may be used together. In addition, part or all of each function may be realized by a server. Note that, the server may be a local server, a cloud server, an edge server, a network service, etc., as long as it is capable of executing functions in cooperation with other components part via communication, and the form does not matter. Information such as programs, tables, and files that realize each function may be stored in memory device such as memory, hard disks, SSD (Solid State Drive), or recoding media such as IC card, SD card, and DVD, or in device on the communication network.

In addition, the control lines and information lines shown in the figure are those that are considered necessary for explanation, and it does not necessarily represent all the control and information lines on the product. In reality, almost all of the components may be considered to be interconnected.

In VRHMD1, the position of cameras is not limited to the examples described above. The number and structure of the camera 200 is not limited to the examples described above and may be changed as appropriate.

A suitable camera capable of communicating with the VRHMD 1 may be installed in the environment where the VRHMD 1 is used, and the VRHMD 1 may perform processing based on captured images obtained from the camera via communication. In other words, a system may be provided with a camera and the VRHMD 1.

Also, the system may use (operate) multiple VRHMDs 1 with a single camera. Therefore, for example, it is possible to easily perform operation by installing one or a small number of cameras so as to be able to survey the entire environment.

Here, VRHMD 1 determines whether the object is the object set in S2 using the image that the camera acquires. And, if it is determined that the object is the object set in S2, the VRHMD 1 can superimpose and display the image of the object that the camera captures. Note that, the object in the image acquired by the camera or the virtual object that replaced the object, may be superimposed at a predetermined appropriate position (e.g., at the edge side of the display 130) or at a predetermined position, as an example. Also, in the case where multiple cameras are installed and images of objects are superimposed, the object acquired from any one camera or virtual object, as an example, may be superimposed.

In S2, objects that are not superimposed may be set and the memory may store information indicating the type of object not to be displayed. And, the VRHMD 1 may then perform the process of not displaying the object identified from this information. In this way, by setting the objects that are not superimposed, the wearer can immerse himself/herself in the VR space without being aware of the objects. For example, by non-displaying home appliances such as a robot vacuum cleaner, it is possible to immerse himself/herself in the VR space without being aware of the home appliance even when it is in use.

VRHMD 1 may, as an example, acquire data from sensor 105 depending on the situation and process. VRHMD 1 may, for example, detect tilt with acceleration sensor 154 or gyro sensor 155 and perform process compensated for tilt effects.

The battery 109 may be connected to the data bus 103 in order to display information (e.g., the current amount of electricity) of the battery 109. Then, VRHMD 1 may display the information of the battery 109 on the display 130.

REFERENCE SIGNS LIST

1 VRHMD
104 control circuitry
105 sensor
106 communication processor
107 image processor
108 sound processor
130 display
200 camera

The invention claimed is:

1. A head mounted display for virtual space comprising:
- a display configured to display an image of a virtual space;
- a camera configured to capture a real space to output a captured image;
- a distance sensor configured to detect a distance to an object in the real space;
- a memory configured to i) store a type condition and a distance condition of the object whose image is to be displayed on the display and ii) store, as the distance condition, a first distance and a second distance longer than the first distance; and
- circuitry configured to:
- recognize the object from the captured image of the camera;
- detect a distance to the recognized object by the distance sensor;
- in response to the detected distance being shorter than the first distance, regardless of a type of the recognized object, generate an image showing the recognized object and display the generated image on the display superimposing on the image of the virtual space;
- in response to i) the detected distance being equal to or longer than the first distance and shorter than the second distance and ii) the type of the recognized object not matching the type condition, not display the image showing the recognized object on the display; and
- in response to i) the detected distance being equal to or longer than the first distance and shorter than the second distance and ii) the type of the recognized object matching the type condition, generate an image showing the recognized object and display the generated image on the display superimposing on the image of the virtual space.

2. The head mounted display according to claim 1, wherein the image showing the recognized object is an image in which a portion corresponding to the recognized object is cut out from the captured image, or an image in which an outline of the recognized object is extracted from the captured image.

3. The head mounted display according to claim 1, wherein the image showing the recognized object is an image of a virtual object that represents the type of the recognized object.

4. The head mounted display according to claim 1, wherein the distance sensor, includes i) a microphone that collects ambient sound and ii) a sound processing apparatus that creates data of an ambient sound image for use in determining a type of the object as a sound source and identifying a position of the sound source.

5. The head mounted display according to claim 1, wherein the distance sensor includes a wireless communication interface, and detects the distance to the object as a wireless communication apparatus in the real space based on a received signal strength or communication delay time of the wireless communication interface, and the memory stores, as the type condition, identification information of the wireless communication apparatus.

6. The head mounted display according to claim 1, wherein the type condition is condition indicating a moving object.

7. A head mounted display system including a camera configured to capture a real space to output a captured image, and a head mounted display, wherein the head mounted display includes:

a display configured to display an image of a virtual space;

a distance sensor configured to detect a distance to an object in the real space;

a memory configured to i) store a type condition and a distance condition of the object whose image is to be displayed on the display and ii) store, as the distance condition, a first distance and second distance longer than the first distance, and circuitry configured to:

recognize the object from the captured image of the camera;

detect a distance to the recognized object by the distance sensor;

in response to the detected distance being shorter than the first distance, regardless of a type of the recognized object, generate an image showing the recognized object and display the generated image on the display superimposing on the image of the virtual space;

in response to i) the detected distance being equal to or longer than the first distance and shorter than the second distance and ii) the type of the recognized object not matching the type condition, not display an image showing the recognized object on the display; and in response to i) the detected distance being equal to or longer than the first distance and shorter than the second distance and ii) the type of the recognized object matching the type condition, generate an image showing the recognized object and display the generated image on the display superimposing on the image of the virtual space.

8. The head mounted display system according to claim 7, wherein, the image showing the recognized object, is an image in which a portion corresponding to the recognized object is cut out from the captured image, or an image in which an outline of the recognized object is extracted from the captured image.

9. The head mounted display system according to claim 7, wherein the image showing the recognized object is an image of a virtual object that represents the type of the recognized object.

10. The head mounted display system according to claim 7, wherein, the distance sensor includes i) a microphone that collects ambient sound, and ii) a sound processing apparatus that creates data of an ambient sound image for use in determining a type of the object as a sound source and identifying a position of the sound source.

11. The head mounted display system according to claim 7, wherein, the distance sensor includes a wireless communication interface and detects the distance of the object as a wireless communication apparatus in the real space based on a received signal strength or communication delay time of the wireless communication interface, and the memory stores, as the type condition of the object to be displayed, identification information of the wireless communication apparatus.

12. A head mounted display comprising:

a display configured to display an image of a virtual space;

a communication interface configured to communicate with a camera that captures a real space to output a captured image;

a distance sensor configured to detect a distance to an object in the real space;

a memory configured to i) store a type condition and a distance condition of the object whose image is to be displayed on the display and ii) store, as the distance condition, a first distance and a second distance which is longer than the first distance; and circuitry configured to:

obtain the captured image from the camera via the communication interface;

recognize the object from the captured image;

detect a distance to the recognized object by the distance sensor;

in response to the detected distance being shorter than the first distance, regardless of a type of the recognized object, generate an image showing the recognized object and display the generated image on the display superimposing on the image of the virtual space;

in response to i) the detected distance being equal to or longer than the first distance and shorter than the second distance and ii) the type of the recognized object not matching the type condition, not display an image showing the recognized object on the display; and in response to i) the detected distance being equal to or longer than the first distance and shorter than the second distance and ii) the type of the recognized object matching the type condition, generate an image showing the recognized object and display the generated image on the display superimposing on the image of the virtual space.

13. The head mounted display according to claim 12, wherein the type condition is condition indicating a moving object.

14. The head mounted display according to claim 12, wherein the image showing the recognized object, is an image in which a portion corresponding to the recognized object is cut out from the captured image, or an image in which an outline of the recognized object is extracted from the captured image.

15. The head mounted display according to claim 12, wherein the image showing the recognized object is an image of a virtual object that represents the type of the recognized object.

16. The head mounted display according to claim 12, wherein the distance sensor includes i) a microphone that collects ambient sound and ii) a sound processing apparatus that creates data of an ambient sound image for use in determining a type of the object as a sound source and identifying a position of the sound source.

* * * * *